(12) United States Patent
Inai

(10) Patent No.: US 10,406,717 B2
(45) Date of Patent: Sep. 10, 2019

(54) TABLE CUTTING MACHINE

(71) Applicant: MAKITA CORPORATION, Anjo-shi, Aichi (JP)

(72) Inventor: Masahiko Inai, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/679,342

(22) Filed: Aug. 17, 2017

(65) Prior Publication Data
US 2017/0341261 A1 Nov. 30, 2017

Related U.S. Application Data

(63) Continuation of application No. 14/510,611, filed on Oct. 9, 2014, now Pat. No. 9,757,872, which is a (Continued)

(30) Foreign Application Priority Data

Mar. 21, 2008 (JP) .................................. 2008-074218

(51) Int. Cl.
*B27B 5/00* (2006.01)
*B23D 19/00* (2006.01)
(Continued)

(52) U.S. Cl.
CPC ............ *B27G 19/02* (2013.01); *B23D 45/042* (2013.01); *B23D 45/048* (2013.01); *Y10T 83/207* (2015.04);
(Continued)

(58) Field of Classification Search
CPC .... B23D 45/042; B23D 45/048; B27G 19/02; Y10T 83/207; Y10T 83/606; Y10T 83/734; Y10T 83/7697; Y10T 83/7734
(Continued)

(56) References Cited

U.S. PATENT DOCUMENTS 1,830,151 A * 11/1931 Wilderson ........... B23D 59/006
144/252.1
2,589,309 A * 3/1952 Tompkins .............. B27G 19/02
144/253.1
(Continued)

FOREIGN PATENT DOCUMENTS

DE 31 36 591 A1 10/1982
EP 1 400 296 A2 3/2004
(Continued)

OTHER PUBLICATIONS

Sep. 28, 2016 Office Action issued in U.S. Appl. No. 14/510,611.
(Continued)

*Primary Examiner* — Ghassem Alie
*Assistant Examiner* — Bharat C Patel
(74) *Attorney, Agent, or Firm* — Oliff PLC

(57) ABSTRACT

A cutting machine can include a cutting machine body that is movably supported above a table and capable of vertical movement, the cutting machine body can be positioned at an upward waiting position and a lower end position. The cutting machine body can include an auxiliary cover positioned around a portion of a blade and including a projection. When in the upward waiting position the auxiliary cover is not able to move upward because of the position of the projection, and in the lower end position the auxiliary cover is able to move upward.

19 Claims, 11 Drawing Sheets

Related U.S. Application Data continuation of application No. 12/382,543, filed on Mar. 18, 2009, now Pat. No. 8,887,606.

(51) Int. Cl.
  *B26D 1/18* (2006.01)
  *B27G 19/02* (2006.01)
  *B23D 45/04* (2006.01)

(52) U.S. Cl.
  CPC ............ *Y10T 83/606* (2015.04); *Y10T 83/734* (2015.04); *Y10T 83/7697* (2015.04); *Y10T 83/7734* (2015.04)

(58) Field of Classification Search
  USPC .............................. 83/471.3, 473, 490, 477.2
  See application file for complete search history.

(56) References Cited

U.S. PATENT DOCUMENTS

| | | | |
|---|---|---|---|
| 2,926,709 A | 3/1960 | Kaley | |
| 3,965,787 A | 6/1976 | Plischke | |
| 3,998,121 A * | 12/1976 | Bennett | B23D 45/044 83/471.3 |
| 4,150,598 A * | 4/1979 | Berends | B23Q 11/08 83/440.2 |
| 4,343,213 A | 8/1982 | Drixler | |
| D275,015 S | 8/1984 | von der Wouw | |
| 4,489,633 A | 12/1984 | van de Wouw | |
| 5,129,300 A | 7/1992 | Kawakami | |
| 5,203,245 A | 4/1993 | Terpstra | |
| 5,257,570 A * | 11/1993 | Shiotani | B23D 45/044 83/471.3 |
| 5,353,670 A | 10/1994 | Metzger, Jr. | |
| 5,370,025 A | 12/1994 | Itzov | |
| 5,445,056 A | 8/1995 | Folci | |
| 5,782,153 A * | 7/1998 | Sasaki | B23D 59/006 83/162 |
| 5,893,311 A * | 4/1999 | Huang | B23Q 11/06 83/397 |
| 5,918,522 A | 7/1999 | Benedict et al. | |
| 5,927,171 A * | 7/1999 | Sasaki | B23D 59/006 83/100 |
| 5,931,072 A | 8/1999 | Shibata | |
| 5,937,720 A | 8/1999 | Itzov | |
| 5,950,514 A | 9/1999 | Benedict et al. | |
| 6,415,699 B1 | 7/2002 | Bettacchini et al. | |
| 6,431,040 B1 | 8/2002 | Miller et al. | |
| 6,510,772 B2 * | 1/2003 | Brickner, Jr. | B08B 15/04 15/339 |
| 6,742,425 B2 * | 6/2004 | Oktavec | B23D 59/006 83/100 |
| 6,758,122 B2 | 7/2004 | Kao | |
| 6,971,297 B1 | 12/2005 | Meredith et al. | |
| 6,988,435 B2 | 1/2006 | Kao | |
| 7,069,831 B2 | 7/2006 | Chang | |
| 7,204,178 B2 * | 4/2007 | Bergmann | B23D 59/006 83/100 |
| 7,210,385 B2 * | 5/2007 | Stumpf | B23D 45/048 83/471.3 |
| 7,243,587 B2 | 7/2007 | Carroll et al. | |
| 7,387,056 B2 * | 6/2008 | Higuchi | B23D 45/027 83/483 |
| 7,669,510 B2 * | 3/2010 | Imamura | B27B 5/29 83/471.3 |
| 7,789,003 B2 * | 9/2010 | Chen | B23D 45/044 83/100 |
| 8,069,761 B2 | 12/2011 | Brunson et al. | |
| 8,161,858 B2 | 4/2012 | Aoyama | |
| 8,522,656 B2 | 9/2013 | Kani et al. | |
| 8,887,606 B2 | 11/2014 | Inai | |
| 2003/0226436 A1 | 12/2003 | Higuchi | |
| 2006/0005681 A1 | 1/2006 | Lambert et al. | |
| 2006/0107810 A1 | 5/2006 | Chiu | |
| 2006/0162523 A1 | 7/2006 | Hetcher et al. | |
| 2006/0185484 A1 | 8/2006 | Sasaki et al. | |
| 2007/0151434 A1 * | 7/2007 | Oberheim | B23D 45/048 83/581 |
| 2007/0214928 A1 * | 9/2007 | Wikle | B23D 45/048 83/477.1 |
| 2007/0221026 A1 * | 9/2007 | Parks | B23D 45/048 83/397 |
| 2008/0276776 A1 | 11/2008 | Kani et al. | |
| 2009/0158904 A1 | 6/2009 | Chen | |

FOREIGN PATENT DOCUMENTS

| | | |
|---|---|---|
| EP | 1 813 400 A3 | 1/2008 |
| EP | 2 969 338 A4 | 11/2016 |
| EP | 2 969 333 A4 | 12/2016 |
| JP | S57-127619 A | 8/1982 |
| JP | H07-276302 A | 10/1995 |
| JP | H08-309618 A | 11/1996 |
| JP | H10-34610 A | 2/1998 |
| JP | 2004-330618 A | 11/2004 |

OTHER PUBLICATIONS

Jul. 31, 2012 Office Action issued in Japanese Patent Application No. 2008-074218 (with translation).
Nov. 30, 2012 Extended European Search Report issued in European Patent Application No. 12190238.1.
Aug. 6, 2010 European Search Report in European Patent Application No. 09004066.8.
Jun. 10, 2016 Office Action issued in U.S. Appl. No. 14/510,611.
May 24, 2017 Notice of Allowance issued in U.S. Appl. No. 14/510,611.

* cited by examiner

TABLE CUTTING MACHINE

This application is a continuation application of U.S. patent application Ser. No. 14/510,611, filed Oct. 9, 2014, pending, which is a continuation application of U.S. patent application Ser. No. 12/382,543, now U.S. Pat. No. 8,887,606, which was filed Mar. 18, 2009 and claims priority to Japanese Patent Application No. 2008-74218, flied Mar. 21, 2008, the contents of which are incorporated herein by reference.

BACKGROUND OF THE INVENTION

Technical Field

The present invention relates to a table cutting machine adapted to move a cutting machine body provided with, for example, a round grind stone or a rotary blade such as saw tooth downward for carrying out a cutting operation or the like to a cut material fixed on a table.

Description of the Related Art

In the table cutting machine having a configuration in which a substantially upper half range of the periphery of the rotary blade is covered with a fixed cover (blade case) and a substantially lower half range of the peripheral thereof is covered with a movable cover which employs an open-close system has been disclosed. An electric motor as a drive source is arranged on the rear side of the fixed cover. The electric motor causes a spindle projecting into the fixed cover to rotate. The rotary blade is mounted to the spindle. The movable cove is gradually opened in association with the downward movement of the cutting machine body and, meanwhile, a lower portion of the rotary blade is gradually exposed and this exposed portion gradually cut into the cut material. Therefore, a maximum range of the rotary blade which is able to cut into the cut material is limited to a range exposed downward from the fixed cover in a state in which the movable cover is fully opened.

Yet, a larger cutting depth is required for some special cutting operations. In a case of cutting a so-called crown-mold material, which is a cut material used mainly as a house-building material and has widthwise ends inclined in the opposite directions from each other in terms of the thickness direction, in the widthwise oblique direction for example, since both the oblique end surfaces at the widthwise ends need to be cut at an precise angle, the cut material generally is leaned obliquely between a table and a positioning fence, is fixedly positioned, and is brought into abutment at the inclined end surfaces thereof at the widthwise ends with the upper surface of the table and a positioning surface of the fence respectively in a surface abutment state and, in this state, the table is rotated, and the rotary blade is advanced so as to cut into the material obliquely in terms of the widthwise direction, so that an angular cutting is achieved.

In order to carry out the special cutting operation as described above (for example, the cutting operation carried out for a high cut material by placing the same so as to lean obliquely between the table and the positioning fence), various technologies have been disclosed. For example, a lower end portion of the fixed cover in a range on the rear side of the spindle (the center of rotation of the rotary blade) (hereinafter, referred simply as a rear edge of the fixed cover) is recessed upward to secure a larger cutting depth in the range on the rear side, thereby enabling the above-described special cutting operation.

According to these technologies, as a result of having retracted the rear edge of the fixed cover upward, part of a cutting edge of the rotary blade is not covered completely with the movable cover, and hence a configuration in which the uncovered portion is covered by an additionally provided auxiliary cover. This type of configuration can use a link lever to open and close the auxiliary cover using the upward and downward movement of the cutting machine body or a configuration in which the auxiliary cover is turned in the closing direction by its own weight, is brought into abutment with the upper surface of the cutting material, and is relatively opened by the downward movement of the cutting machine body is employed as the opening and closing operations of the auxiliary cover employed.

However, according to the opening and closing structure of the auxiliary cover in the related art as described above, a technology for reliably locking the auxiliary cover at the closed position in a state in which the cutting machine body is positioned at an upper waiting position has not been proposed.

Further, a lever of a single lever type having one grip has been previously proposed. However, with the fixing lever of the single lever type, the grip is hidden behind the supporting arm portion and hence is hardly visible from the user. Therefore, there is a problem of deterioration of operability in that the user needs to operate blindly and thus difficult and dangerous to reach the lever. Also, fixing lever of a triple lever type having three grips coupled in the radial direction at spaces of 120° with respect to each other has been proposed. In this case, however, there is a case in which one of the grips on the lower side abuts against a floor or the ground on which the cutting machine is installed and hence rotational operation is disabled. Therefore, the respective grips are shortened in order to avoid the abutment as described above, which causes a problem of deterioration of operability.

Thus, there is a need in the art for a configuration in which the range of the rotary blade which is not covered by the movable cover from the range exposed from the fixed cover is covered by the auxiliary cover and the auxiliary cover is reliably locked at the closed position so as not to be operated carelessly to the opening position when the cutting machine body is in a waiting position.

SUMMARY OF THE INVENTION

A cutting machine can include a cutting machine body that is movably supported above a table and capable of vertical movement, the cutting machine body can be positioned at an upward waiting position and a lower end position. The cutting machine body can include an auxiliary cover positioned around a portion of a blade and including a projection. When in the upward waiting position the auxiliary cover is not able to move upward because of the position of the projection, and in the lower end position the auxiliary cover is able to move upward.

BRIEF DESCRIPTION OF THE DRAWINGS

FIG. 1 shows a left side view viewed from a user. FIG. 1 shows a state in which a cutting machine body is held at an upper waiting position.

FIG. 2 shows a state in which the cutting machine body is moved downward to a lower end position.

FIG. 3 shows a state in which a cutting operation is carried out on a cut material by a rotary blade by moving the cutting machine body downward and then sliding the same rearward. FIG. 3 shows a state in which a rearmost position of the cutting machine body is limited by an intermediate stopper mechanism and is held at a position where a front portion of the auxiliary cover is in the course of moving over top of the positioning fence.

FIG. 4 shows a state in which the cutting machine body is moved downward and then slid to the rearmost position of the sliding movement. FIG. 4 shows a state in which the intermediate stopper mechanism is released.

FIG. 5 shows a state in which the cutting machine body is moved downward and then retracted to an intermediate position of an entire sliding range by the intermediate stopper mechanism. FIG. 5 also shows a state in which the front portion of the auxiliary cover is in the course of moving over top of the positioning fence.

FIG. 6 shows a state in which the table cutting machine is viewed from the right side as viewed from the user.

In FIG. 8, a portion of the auxiliary cover near a portion which supports a turning movement is shown in an exploded state. In FIG. 8, part of a fixed cover and part of a link lever are shown by double dashed lines, respectively.

FIG. 9 shows a state in which a shielding edge on the left side when viewed by the user is viewed from inside.

FIG. 10 shows a state in which the cutting machine body is slid to a frontmost position of the sliding movement with respect to the upper sliding mechanism.

FIG. 11 shows a state in which the cutting machine body is slid to the frontmost position with respect to the upper sliding mechanism.

FIG. 14 shows a state in which the cutting machine body is held at a right-angle cutting position with an angle of inclination of zero.

DETAILED DESCRIPTION OF THE INVENTION

Figure 1:
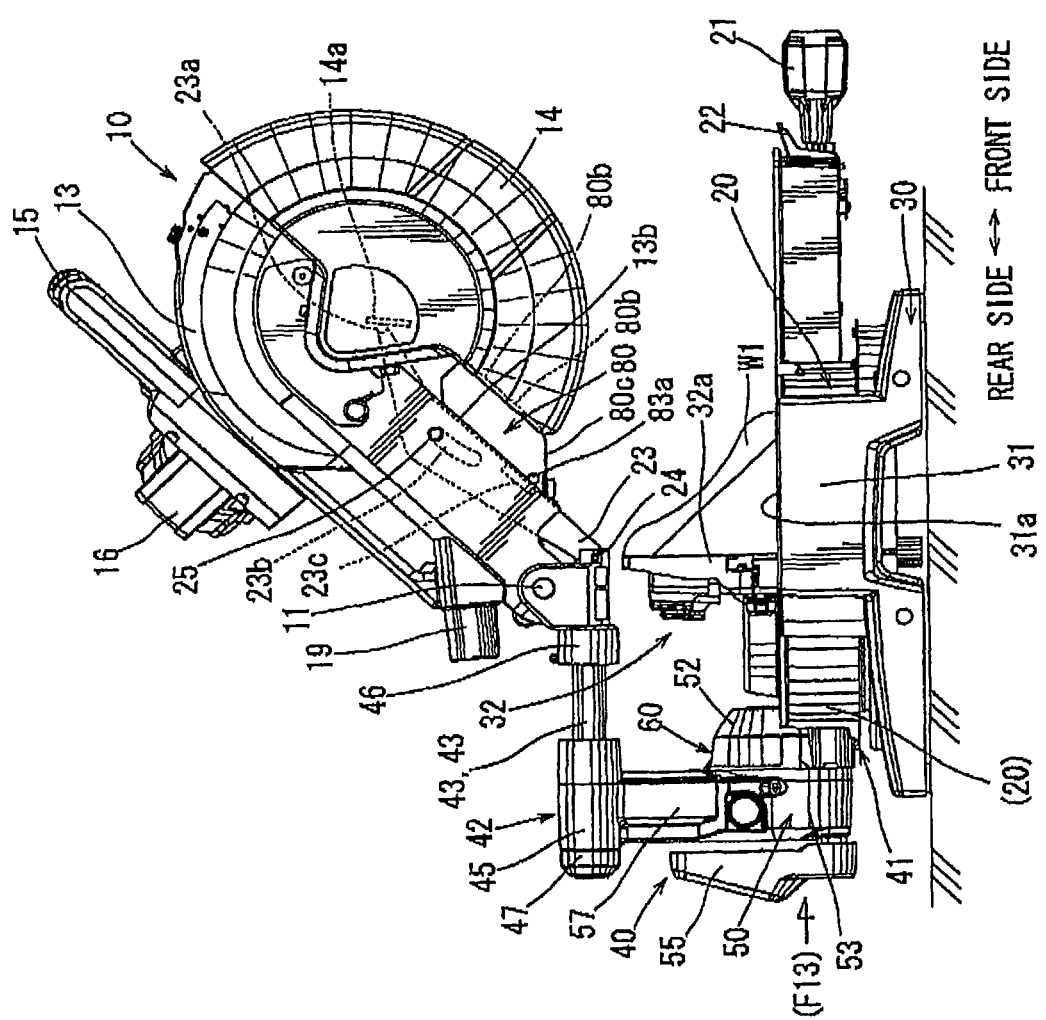
FIG. 1 is a general side view of a table cutting machine according to an embodiment.

Each of the additional features and teachings disclosed above and below may be utilized separately or in conjunction with other features and teachings to provide improved cutting machines. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Referring now to FIG. 1 to FIG. 15, an embodiment of the present invention will be described. FIG. 1 to FIG. 5 show a table-type cutting machine 1 according to the embodiment in general. In FIG. 1 to FIG. 5, a user is positioned on the right side of the cutting machine 1. In the following description, the front and rear of the respective members and the configurations are defined such that the right side in FIG. 1 (near side of the user) corresponds to the front side and the left side corresponds to the rear side.

The cutting machine 1 includes a substantially circular table 20 for placing a cutting material W, a base 30 for supporting the table 20 so as to be capable of rotating horizontally and a cutting machine body 10 arranged above the table 20 via a body supporting member 40 provided at a rear portion (left side portion in FIG. 1) of the table 20. Hereinafter, a so-called crown-mold material W1 to be cut in a state of leaning against a positioning fence and a cut material W2 formed into a normal flat board which is cut in a state in which the widthwise direction thereof is oriented upright at a right angle along the positioning fence are exemplified as the cut materials W. Both the cut materials W (W1, W2) have a height from the upper surface of the table higher than normal, so that a large cutting depth is required for a rotary blade 12.

Figure 5:
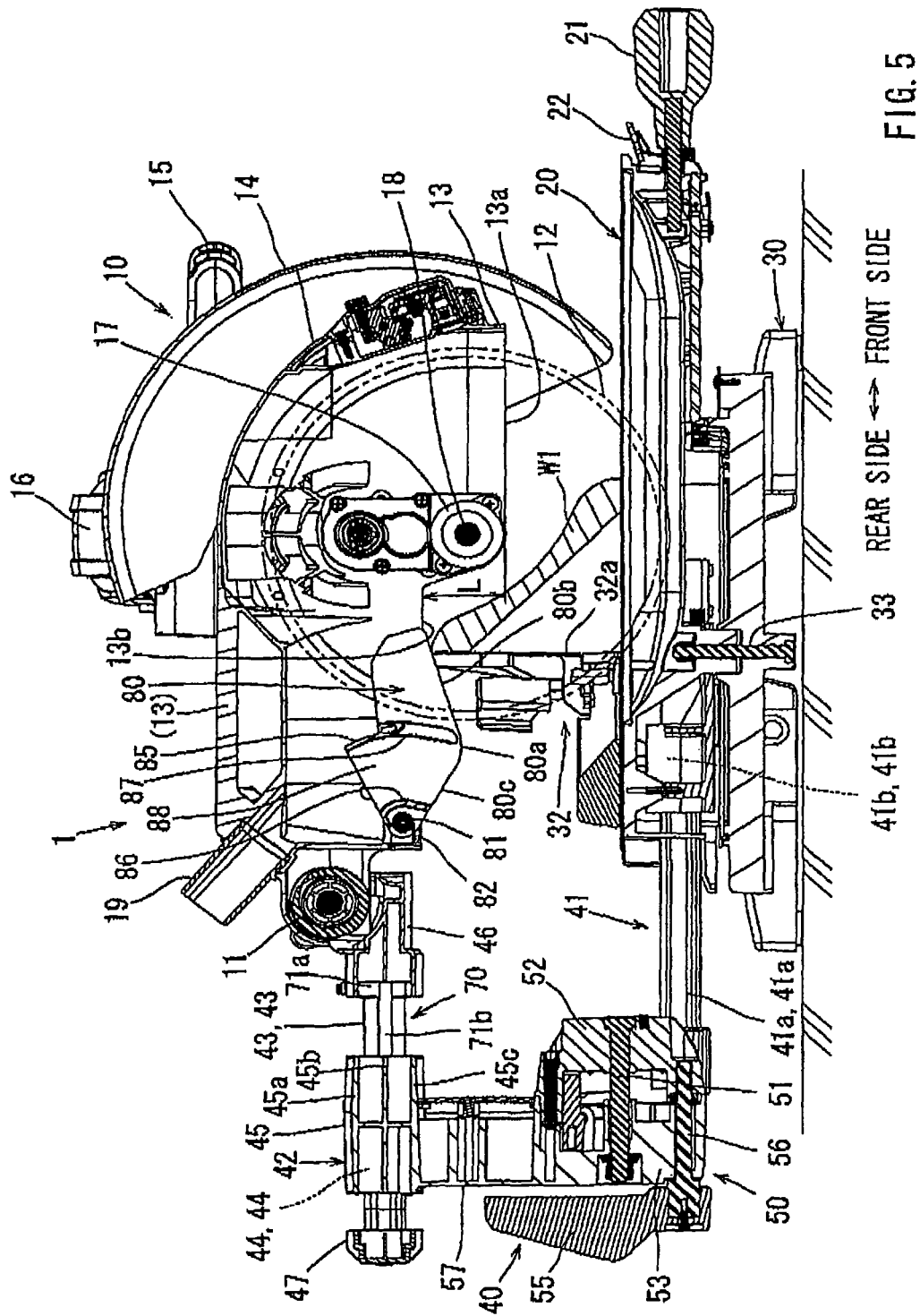
FIG. 5 is a vertical cross-sectional view of the table cutting machine according to the embodiment.

As shown in FIG. 5, the table 20 is supported on the upper surface of the base 30 so as to be capable of rotating horizontally via a shaft 33. The rotational position of the table 20 is adjusted quickly and precisely according to the operation by two-system stopper mechanism. In the drawings, reference numerals 21 and 22 designate operating levers of the two-system stopper mechanism. Both the operating lever 21 and 22 are respectively arranged at a front end portion of the table 20, where the user is able to operate easily.

Both left and right end portions of the base 30 are protruded sideward from the table 20, and the protruded portions correspond to base seats 31 and 31. Upper surfaces 31a and 31a of the left and right base seats 31 and 31 are aligned to be flush with the upper surface of the table 20. A positioning fence 32 is mounted to the upper surfaces 31a and 31a of the left and right base seats 31 and 31 so as to extend across therebetween. The front surface of the positioning fence 32 corresponds to a positioning surface 32a to which the cutting material W is to be abutted. As shown in the drawing, the exemplified positioning fence 32 has the positioning surface 32a at a relatively high position. The positioning surface 32a matches the center of rotation of the table 20 (the axial center of the shaft 33), and is orthogonal to the upper surface of the table 20. The positioning fence 32 enables positioning of the cut material W1 in a state of leaning against the positioning surface 32a and the upper surface of the table 20 so as to extend therebetween as shown in the drawing.

The cutting machine body 10 is supported via the body supporting member 40 so as to be capable of sliding in the fore-and-aft direction and of tilting in the vertical direction. As shown in FIG. 1, a position in which the cutting machine body 10 is returned to the uppermost end corresponds to the waiting position. When the cutting machine body 10 is moved downward from the waiting position (a state shown in FIG. 2) and then the cutting machine body 10 is slid rearward as shown in FIG. 3, the rotary blade 12 is caused to cut into the large cut material W1 for cutting operation.

The cutting machine body 10 is adapted to be able to change the cutting angle of the rotary blade 12 with respect to the cutting material W angularly leftward or rightward in plan view by rotating the table 20 leftward or rightward by an adequate angle. Hereinafter, this cutting state is referred to as angular cutting. In this angular cutting, the axis of rotation of the rotary blade 12 (the axis of rotation of a spindle 18) is maintained in parallel to the upper surface of the table 20 (the direction of the table surface). In this angular cutting operation, the rotary blade 12 advances so as to cut into the material obliquely with respect to the positioning surface 32a of the positioning fence 32. When the rotary blade 12 advances so as to cut into the material in the direction orthogonal to the positioning surface 32a, a right angle cutting is achieved. This right angle cutting is used most frequently.

In contrast, the cutting machine body 10 is adapted to be able to carry out the cutting operation by advancing the rotary blade 12 so as to cut into the cutting material W obliquely when viewed from the front (user side) by being inclined leftward or rightward by a tilt supporting mechanism 50 of the body supporting member 40, which will be described later. Hereinafter, this cutting state is referred to as an oblique cutting. In this oblique cutting, the axis of rotation of the rotary blade 12 is maintained in a non-parallel state with respect to the upper surface of the table 2 (the direction of the table surface). The angle of inclination of the rotary blade 12 in this oblique cutting is displayed by an inclined angle display device 60 described later. The right-angle cutting is achieved in a state in which the axis of rotation of the rotary blade 12 is positioned in parallel to the upper surface of the table 20 and the rotary blade 12 is vertically positioned (at an angle of inclination of zero).

In this manner, the cutting machine body 10 is supported by the body supporting member 40 so as to be capable of tilting in the vertical direction, to be capable of sliding in the fore-and-aft direction, and to be capable of tilting in the lateral direction. The body supporting member 40 includes upper and lower sliding mechanisms 41 and 42 at two levels for supporting the cutting machine body 10 so as to be capable of sliding in the fore-and-aft direction and the lateral tilt mechanism 50 for allowing the cutting machine body 10 to tilt in leftward and rightward when viewed from the user. The slide mechanism 41 on the lower side includes two lower slide bars 41a and 41a supported in parallel at a certain distance in the lateral direction. As shown in FIG. 5, both the lower slide bars 41a and 41a are supported via the bearings 41b mounted to the lower surface of the table 20 respectively so as to be capable of sliding in the fore-and-aft direction. The lateral tilt mechanism 50 is mounted at rear end portions of both the lower sliding bars 41a and 41a.

The lateral tilt mechanism 50 includes a fixed-side supporting member 52 and a tilting-side supporting member 53 coupled via a lateral tilt shaft 51 so as to be capable of mutual rotation. The rear end portions of the lower slide bars 41a and 41a are coupled to the fixed-side supporting member 52. Therefore, both the lower left and right slide bars 41a and 41a slide integrally in parallel to each other in the fore-and-aft direction, whereby the cutting machine body 10 slides in the fore-and-aft direction.

The cutting machine body 10 is tilted in the lateral direction when the tilting-side supporting member 53 rotates by a certain angle leftward or rightward about the lateral tilt shaft 51 with respect to the fixed-side supporting member 52. A positioning mechanism for positioning the cutting machine body 10 at a right angle position, at a 45° inclined position or the like (so-called positive block mechanist) is integrated between the fixed-side supporting member 52 and the tilting-side supporting member 53.

The rotational position of the tilting-side supporting member 53 with respect to the fixed-side supporting member 52, that is, the leftward or rightward tilted position of the cutting machine body 10 is fixed by tightening a fixing lever 55. The tilted position of the cutting machine body 10 is quickly and precisely read by the inclined angle display device 60.

Figure 13:
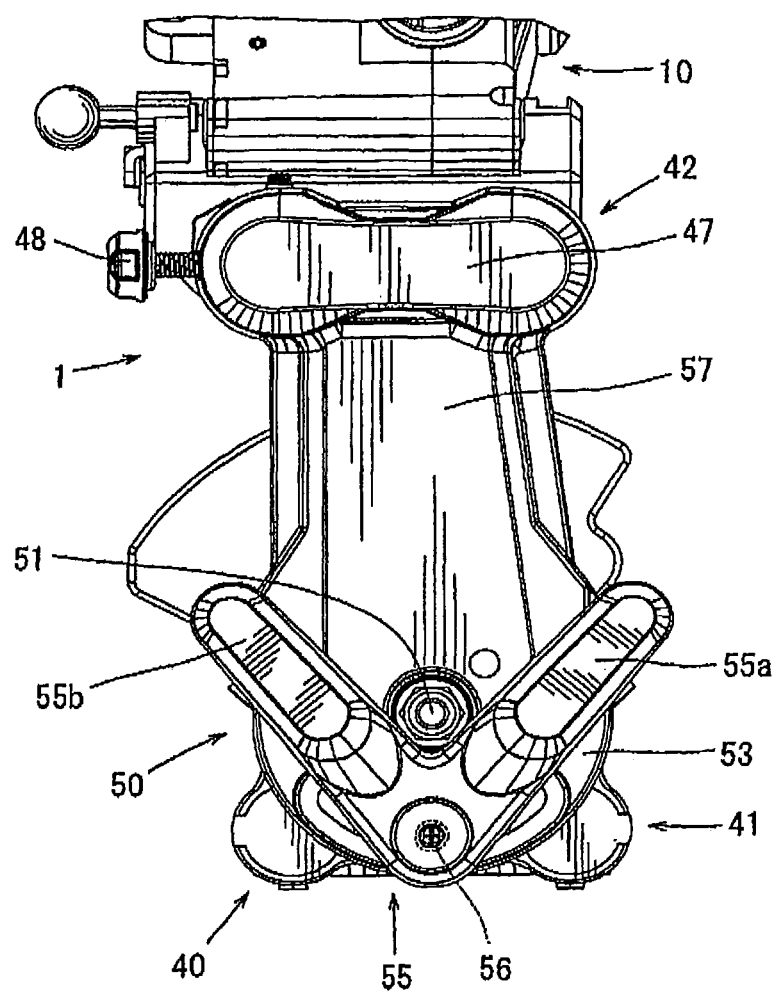
FIG. 13 is a rear view of a fixing lever and the periphery thereof viewed from the rear in the direction of arrow indicated by (F13) in FIG. 1.

The fixing lever 55 is arranged on the rear side of the tilting-side supporting member 53. As shown in FIG. 13, the fixing lever 55 assumes a V-shape with a left grip 55a on the left side and a right grip 55b on the right side when viewed from the user coupled to each other at the lower ends thereof in the case of this example, the left and right grips 55a and 55b are coupled to each other at an angle of approximately 80° as shown in FIG. 13. Both the left and right grips 55a and 55b have a length that the user is able to grip easily with one hand. A fixing screw 56 is mounted to a coupled portion between both the grips 55a and 55b. The angle formed between both the grips 55a and 55b may be set arbitrarily within a range from 60° to 100°, in addition to the angle of approximately 80° described above. As described later, an angle of 60° or larger formed between both the grips 55a and 55b ensures the easy visibility of both the grips 55a and 55b from the user and allows the user to grip one of them easily. An angle of 100° or smaller ensures prevention of interference of one of the grips with a floor or the ground when rotating the other grip.

As shown in FIG. 5, the fixing screw 56 penetrates through the tilting-side supporting member 53 and is screwed into the fixed-side supporting member 52. The fixing screw 56 is arranged below the lateral tilt shaft 51 in parallel thereto at a certain distance therefrom. When the fixing lever 55 is turned to the tightening direction (for example, clockwise in FIG. 13), the fixing screw 56 is tightened with respect to the fixed-side supporting member 52 to fix the tilting-side supporting member 53 so as not to be able to rotate with respect to each other, whereby the cutting machine body 10 is fixed at the oblique position or the right-angle position. When the fixing lever 55 is turned in the loosening direction (for example, counterclockwise in FIG. 13) by an adequate angle (for example, about 30°), the fixing screw 56 is loosened with respect to the fixed-side supporting member 52 and, consequently, the tilting-side supporting member 53 is brought into a state of being capable of rotating with respect to the fixed-side supporting member 52, which allows the cutting machine body 10 to tilt leftward or rightward.

The fixing lever 55 in this example is easy to tilt either in the tightening direction or in the loosening direction by gripping one of the left and right grips 55a and 55b. Therefore, if the user is right-handed, he/she is able to tilt the fixing lever 55 easily by reaching out with his/her right hand to the rear side of the body supporting member 40 via the right side of the cutting machine 1 and gripping the right grip 55b. In contrast, if the user is left-handed, he/she is able to tilt the fixing lever 55 easily by reaching out with his/her left hand to the rear side of the body supporting member 40 via the left side of the cutting machine 1 and gripping the left grip 55a.

FIG. 13 shows a state in which the fixing lever 55 is firmly tightened (obliquely fixed state), a state in which the tilting-side supporting member 53 is fixed with respect to the fixed-side supporting member 52, and a state in which the cutting machine body 10 is fixed in terms of the lateral tilt position. As shown in the drawing, in this obliquely fixed state, a state of attaching the fixing screw 56 with respect to the fixing lever 55 is adequately set so as to achieve a state in which the left and right grips 55a and 55b are inclined at the substantially same angle leftward and rightward with respect to the supporting arm portion 57. Therefore, the user is able to view both the left and right grips 55a and 55b easily and is able to grip bath the left and right grips 55a and 55b easily by reaching out with the left hand or the right hand to the rear side.

With the exemplified V-shaped fixing lever 55, since the left and right grips 55a and 55b protrude leftward and rightward with respect to the supporting arm portion 57, respectively, the user is able to view easily and is able to grip in a comfortable posture.

Further, with the fixing lever 55 in this embodiment, the two grips 55a and 55b are arranged in a V-shape extending upward from a head of the fixing screw 56, and hence there is no portion protruding downward. Also, since the fixing screw 56 functions sufficiently by being rotated in the tightening direction or the loosening direction by approximately 30°, the fixing lever 55 needs not to be rotated to a position where the grips 55a and 55b protrude downward from the fixing screw 56. Therefore, in the exemplified fixing lever 55, since the sufficient length of the respective grips 55a and 55b which allows the user to grip easily is secured, and they are coupled in the V-shape opening upward, the problems as in the related art do not occur.

Figure 14:
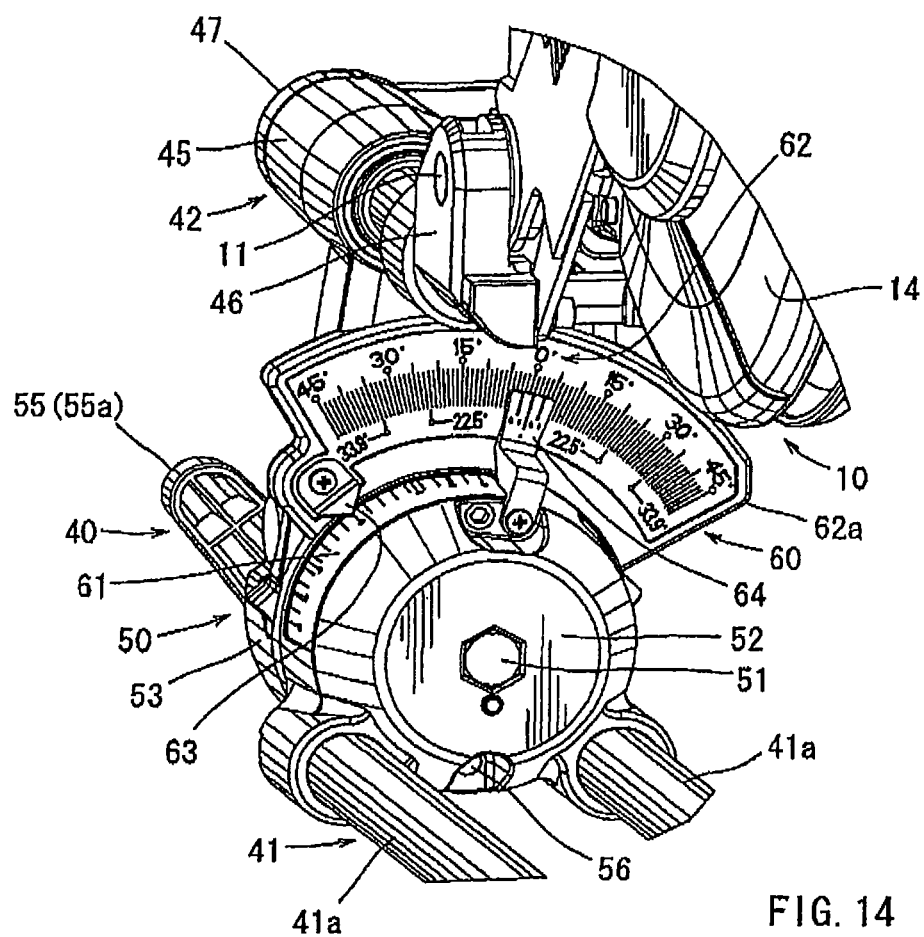
FIG. 14 is a perspective view of an inclined angle display device viewed from the left front side.

Subsequently, FIG. 14 shows the inclined angle display device 60 for displaying the lateral position or inclination of the cutting machine body 10 in detail.

The inclined angle display device 60 in this example includes a first angle scale 61 mounted to the fixed-side supporting member 52 and a second angle scale 62 mounted to the tilt supporting member 53. The first angle scale 61 in this embodiment is displayed on a sheet material, which is attached along the peripheral surface of the fixed-side supporting member 52. Therefore, scale markings of the first angle scale 61 are displayed substantially in parallel to the center axis of tilting movement of the cutting machine body 10 (the axial line of the tilt shaft 51), and are adapted to be legible mainly from above (visibility from above). The first angle scale 61 includes scale markings displayed thereon at every 5° in angle of inclination of the cutting machine body 10. A first indicator 63 for reading the first angle scale 61 is mounted to the tilt supporting member 53.

The second angle scale 62 is displayed on a substantially fan-shaped scale panel 62a as shown in the drawing. The scale panel 62a is mounted from the front so as to protrude radially upward along the upper portion of the tilt supporting member 53. Therefore, the scale markings of the second angle scale 62 are displayed along the radial direction with respect to the center axis of the tilting movement of the cutting machine body 10 (the axial line of the tilt shaft 51), and are adapted to be legible mainly from the front (visibility from the front).

When the mounting precision of the second angle scale 62 with respect to the front surface of the upper portion of the tilting-side supporting member 53 and the mounting precision of the first angle scale 61 with respect to the outer peripheral surface of the fixed-side supporting member 52 are compared, the latter is able to be attached at a higher mounting precision. In the former case, since the scale panel is generally formed of a metal plate or a sheet material and is attached on the front surface of the tilting-side supporting member 53, the positional precision (mounting precision) with respect to the lateral tilt shaft 51 is more difficult to be ensured at the time of assembly. In contrast, in the latter case, since the first angle scale 61 is attached on the peripheral surface of the fixed-side supporting member 52, assembly with the high precise positioning and the concentricity of the first angle scale 61 with respect to the lateral tilt shaft 51 is easily achieved at the time of assembly by being attached along the peripheral surface thereof as long as the peripheral surface of the fixed-side supporting member 52 is manufactured at a high degree of precision in terms of position and concentricity with respect to the lateral tilt shaft 51.

The second angle scale 62 is arranged on the outer peripheral side which is spaced more from the tilt shaft 51 in the radial direction than the first angle scale 61 and hence the pitch of the scale markings for the corresponding angles is larger than the pitch of the first angle scale 61. Therefore, in the case of the second angle scale 62 in this example, the scale markings are displayed at an increment of 1° for the angle of inclination of the cutting machine body 10, and the sufficient visibility is ensured for the respective scale markings. A second indicator 64 for reading the second angle scale 62 is mounted to the fixed-side supporting member 52.

In this manner, the inclined angle display device 60 in this embodiment is largely characterized in that the first angle scale 61 is on the radially inner peripheral side and the second angle scale 62 is on the radially outer peripheral side with respect to the center of tilting movement of the cutting machine body 10 (the lateral tilt shaft 51). The precision in mounting position of the first angle scale 61 is higher than that of the second angle scale 62, while the display precision in scale markings of the second angle scale 62 is higher (the finer angular display) than that of the first angle scale 61.

In addition, since the second angle scale 62 whose scale markings are displayed with finer display precision is legible mainly from the front and the first angle scale 61 is legible mainly from above, the user-friendliness is remarkably improved in that both the angular scales 61 and 62 may be selectively used depending on the operating posture of the user, or depending on the precision required for the angle of inclination of the cutting machine body 10. In particular, since the user may obliquely look down at the first angle scale 61, the user is able to view in a comfortable posture, and hence a superior visibility is achieved.

As shown in the drawing, the second angle scale 62 includes angles of inclination of 22.5° and 33.9° which are useful for some cutting operation in addition to the scale markings of 0°, 15°, 30° and 45° on both leftward and rightward respectively in the indications of numerical values.

Figure 15:
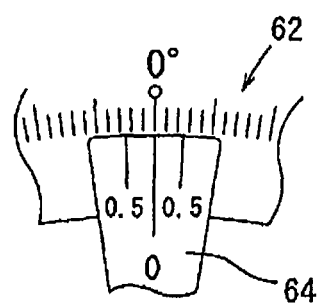
FIG. 15 is an enlarged view of a second angle seal a second indicator.

Furthermore, as shown in FIG. 15, the second indicator 64 includes a secondary scale indicated thereon. As regards the second angle scale 62 as a primary scale, for example, two secondary scale markings of 0.5 at pitches of 0.9°, which is an angle obtained by dividing 9° equally by 10, for example, and a reference line zero are indicated on the second indicator 64. Therefore, the angle of inclination of the cutting machine body 10 is adapted to be read precisely at pitches of 0.5° with the second angle scale 62.

The supporting arm portion 57 is provided on top of the fixed-side supporting member 53 so as to extend upward. An upper slide mechanism 42 is provided on top of the supporting arm portion 57. The upper slide mechanism 42 includes a pair of left and right upper slide bars 43 and 43 extending in parallel to each other. Both the upper slide bars 43 and 43 are supported by the bearings 44 so as to be slidable in the fore-and-aft direction. Both the bearings 44 and 44 are held by a bearing holder 45 provided on top of the supporting arm portion 57. Front ends of both the upper slide bars 43 and 43 are coupled to each other by a tilting bracket 46. The cutting machine body 10 is supported by the tilting bracket 46 via the vertical tilt shaft 11 so as to be capable of tilting in the vertical direction. Rear ends of both the slide bars 43 and 43 are coupled to each other by a connecting bracket 47. Therefore, the upper slide bars 43 and 43 slide integrally in the fore-and-aft direction in a state of being fixed in parallel to each other. The cutting machine body 10 slides in the fore-and-aft direction in association with the fore-and-aft sliding movement of both the slide bars 43 and 43. As shown FIG. 6, an upper slide fixing screw 48 is provided on the side portion of the bearing holder 45. When the upper slide fixing screw 48 is tightened, both the upper slide bars 43 and 43 are unslidably fixed to the bearing holder 45, so that the sliding movement of the cutting machine body 10 by the upper slide mechanism 42 is brought into a locked state. By loosening the upper slide fixing screw 48, the cutting machine body 10 is allowed to slide in the fore-and-aft direction by the upper slide mechanism 42.

In this manner, with the body supporting member 40 including the upper and lower sliding mechanisms 41 and 42 at two levels and the lateral tilt supporting mechanism 50, the cutting machine body 10 is supported so as to be capable of sliding in a stroke which is long in the fore-and-aft direction and to be capable of tilting movement in the lateral direction independently from this sliding movement.

Figure 10:
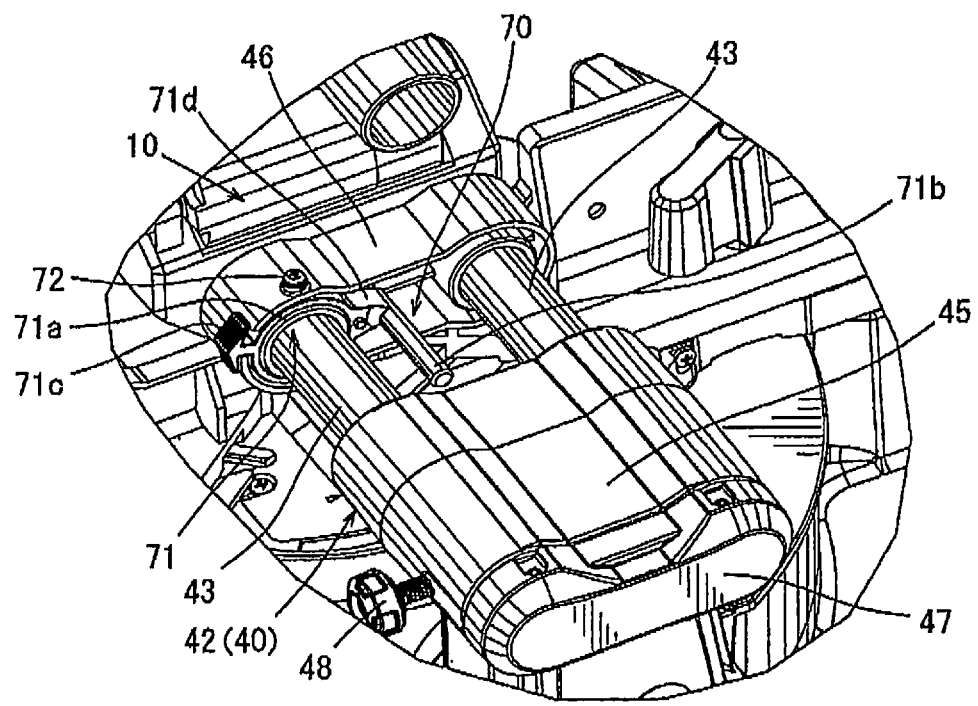
FIG. 10 is a perspective view of an upper sliding mechanism and a periphery thereof viewed obliquely from above on the rear side.
Figure 11:
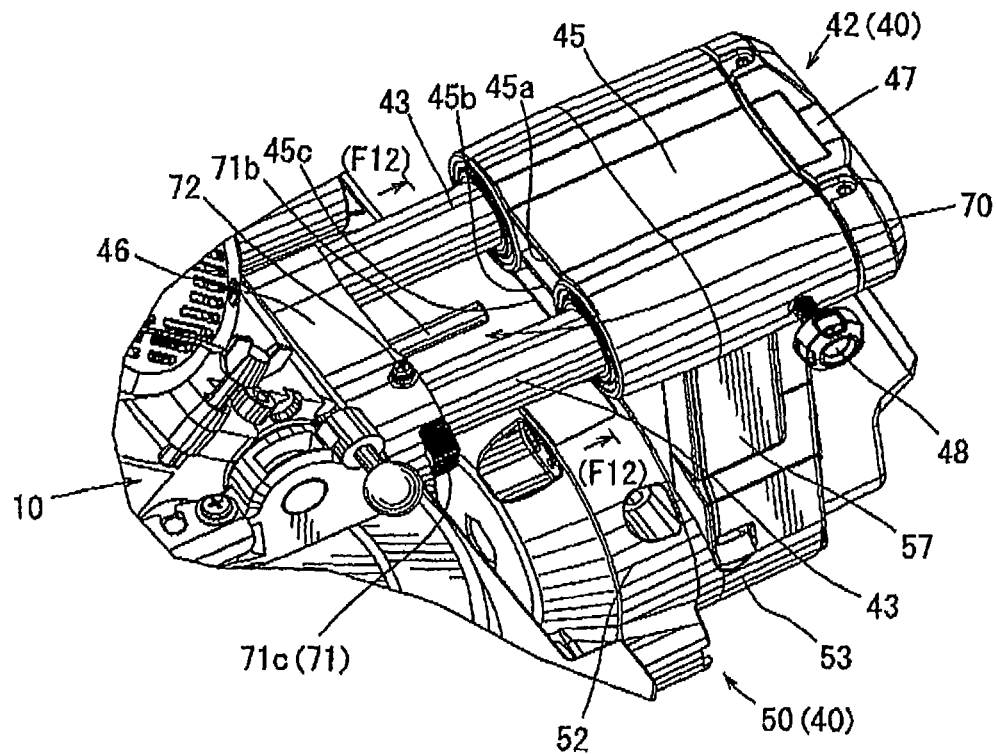
FIG. 11 is a perspective view of the upper sliding mechanism and the periphery thereof viewed obliquely from the front.

The upper slide mechanism 42 includes an intermediate stopper mechanism 70 for constraining the retracting operation (rearmost sliding position) of the cutting machine body 10 at a midpoint of the entire sliding range integrated therein. The intermediate stopper mechanism 70 is illustrated in FIG. 10 and FIG. 11 in detail. The intermediate stopper mechanism 70 includes a stopper body 71 mounted to one of the upper slide bars 43. The stopper body 71 includes an annular supporting portion 71*a* which allows insertion of the upper slide bar 43 in a state of being capable of rotating with respect to each other without rattling or obstruction, a stopper shaft portion 71*b* and a switch lever portion 71*c* provided integrally with the periphery of the annular supporting portion 71*a*, respectively.

As shown in FIG. 10, the stopper body 71 is held so as to be capable of turning within a certain angular range about the an axis of the upper slide bar 43 at a position in which the annular supporting portion 71*a* is accommodated in the inner peripheral side of the tilting bracket 46 and the upper slide bar 43 is inserted on the inner peripheral side of the annular supporting portion 71*a* (between the tilting bracket 46 and the upper slide bar 43). A fitting screw 72 is tightened at an upper portion of the tilting bracket 46. The annular supporting portion 71*a* is held so as to be capable of turning in a certain range about the axial line of the upper slide bar 43, but not to be capable of moving in the axial direction by the engagement of the distal end portion of the fitting screw 72 with the annular supporting portion 71*a*.

The stopper shaft portion 71*b* is provided so as to extend in parallel to the upper slide bar 43 and rearward via an arm portion 71*d* extending radially outwardly from the annular supporting portion 71*a*. The switch lever portion 71*c* is arranged so as to be capable of being moved in a certain angular range radially on the outside of the tilting bracket 46. Rotating the switch lever portion 71*c* at a certain angle about the axial line of the upper slide bar 43 allows the annular supporting portion 71*a* to rotate at a certain angle coaxially, thereby allowing the stopper shaft portion 71*b* to rotate and move in the vertical direction within a certain range.

Figure 12:
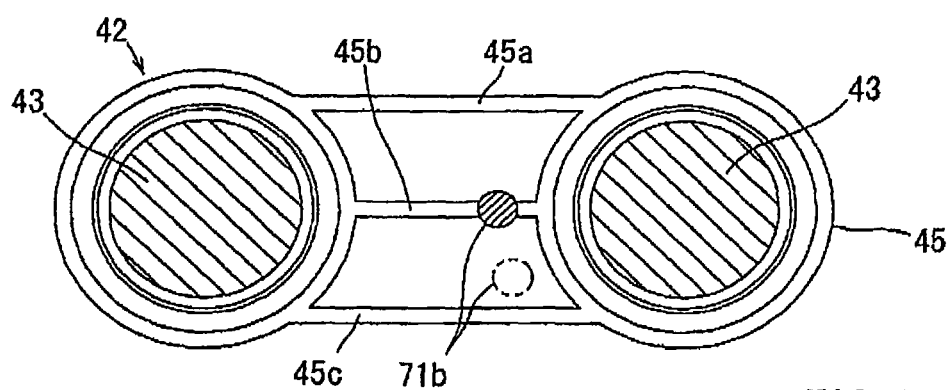
FIG. 12 is a view of a bearing holder and a rib thereof from the front in the direction indicated by arrows (F12)-(F12) in FIG. 11.

The stopper shaft portion 71*b* retracts integrally with the retracting movement of the cutting machine body 10. Abutment of the rear end portion of the stopper shaft portion 71*b* with a center rib 45*a* of the bearing holder 45 restrains the retracting movement of the cutting machine body 10 at a midpoint of the entire sliding range of the upper slide mechanism 42. As shown in FIG. 11 and FIG. 12, three ribs (upper rib 45*a*, center rib 45*b*, lower rib 45*c*) are provided on the front portion of the bearing holder 45 substantially in parallel and equidistantly in the vertical direction.

When the cutting machine body 10 is retracted in a state in which the switch lever portion 71*c* is moved to the intermediate locking position (downward in this embodiment), the stopper shaft portion 71*b* comes into abutment with the front end surface of the center rib 45*b* from among the three ribs 45*a*, 45*b* and 45*c* and hence the retracting movement is restrained, whereby the cutting machine body 10 is brought into a state in which the retracting movement thereof is restrained at a midpoint within the entire sliding range of the upper slide mechanism 42. In contrast, when the switch lever portion 71*c* is moved to an unlocked position (upward in this embodiment), the stopper shaft portion 71*b* moves downward from the abutted position as shown by a double-dashed line in FIG. 12. Therefore, when the cutting machine body 10 is retracted in this state, the stopper shaft portion 71*b* enters a space between the center rib 45*b* and the lower rib 45*c*. In this state, the retracting movement of the stopper shaft portion 71*b* is not restrained, and hence the cutting machine body 10 is allowed to slide to a rearmost position of the sliding movement within the entire sliding range of the upper slide mechanism 42. The function of the intermediate stopper mechanism 70 will be described later.

Figure 6:
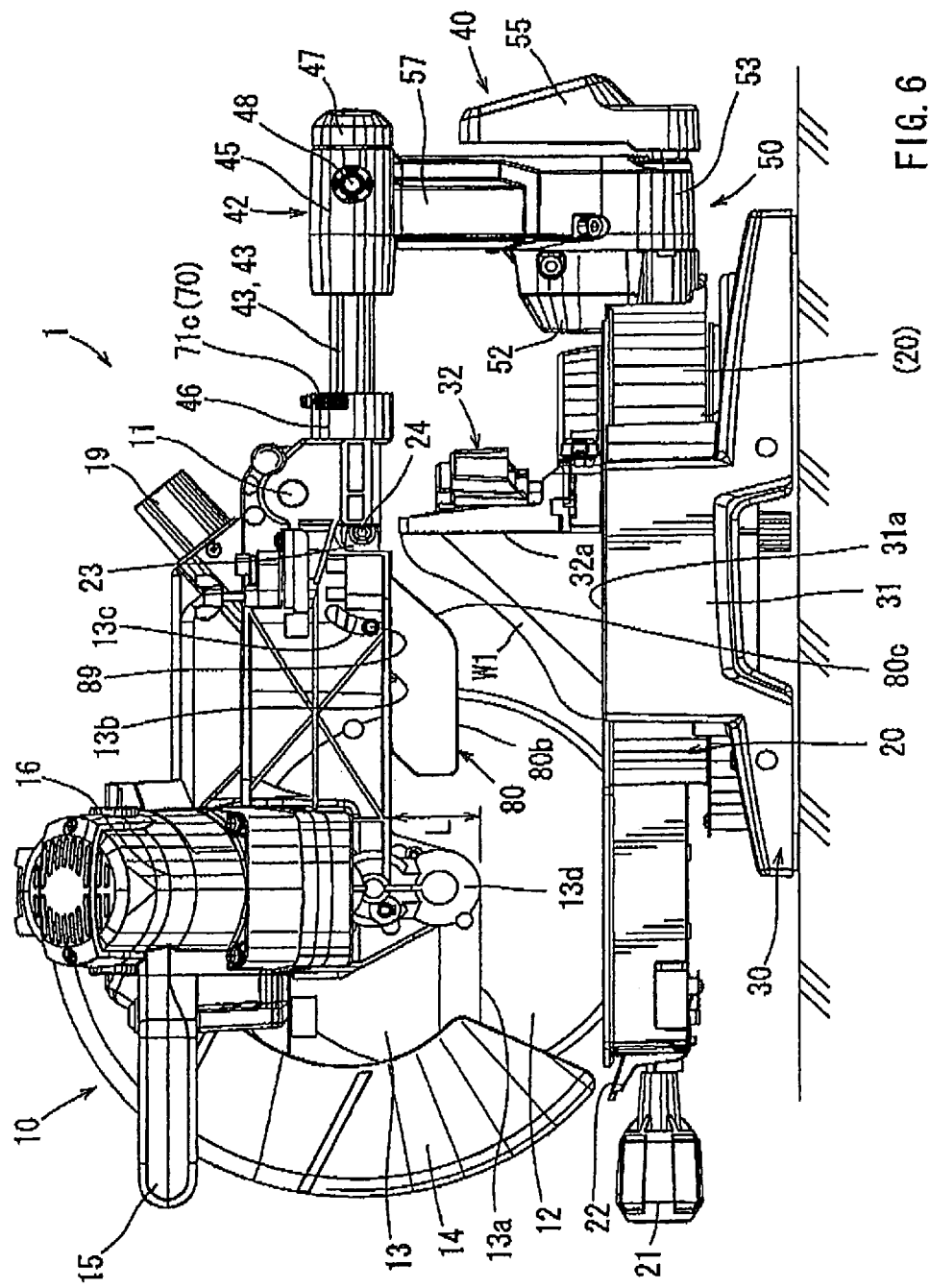
FIG. 6 is a back view of the table cutting machine according to the embodiment.

The cutting machine body 10 is supported at a distal end side of the body supporting member 40 above the table 20 in a state of being capable of tilting in the vertical direction about the vertical tilt shaft 11. As shown in FIG. 6, the cutting machine body 10 is provided with the circular rotary blade 12 which is rotated by the electric motor 16 arranged on the rear side (right side when viewed from the user). The electric motor 16 is mounted in a posture inclined in the direction in which the rear end side is displaced upward. The rotary blade 12 is mounted to the distal end portion of the spindle 18 by a mounting flange 17.

The upper portion of the rotary blade 12 is always covered with the fixed cover 13. The rear end portion of the fixed cover 13 is supported by the tilting bracket 46 of the upper slide mechanism 42 so as to be capable of tilting in the vertical direction via the vertical tilt shaft 11. The electric motor 16 is mounted on the rear side of the fixed cover 13.

The rear portion of the fixed cover 13 is provided with a dust collecting port 19 for mounting a dust box for collecting dust.

The lower portion of the rotary blade 12 is covered with a movable cover 14 which is opened and closed in association with the vertical movement of the cutting machine body 10. The movable cover 14 is opened and closed by the relative displacement of the link lever 23 in association with the vertical movement of the cutting machine body 10. The rear end portion of the link lever 23 is supported by the front portion of the tilting bracket 46 via a shaft 24 so as to be capable of turning in the vertical direction. The approximate midpoint of the link lever 23 (in terms of the longitudinal direction thereof) is provided with an arc-shaped relief groove 23b. An engaging shaft 25 provided on the fixed cover 13 is inserted in the relief groove 23b so as to be relatively displaceable. A front end portion 23a of the link lever 23 is in abutment with an abutment wall portion 14a provided on the movable cover 14. The link lever 23 provided in this manner tilts in the vertical direction in association with the vertical movement of the cutting machine body 10. When the link lever 23 tilts downward in association with the downward movement of the cutting machine body 10, the front end portion 23a thereof presses the abutment wall portion 14a while displacing around the center of turn of the movable cover 14, so that the movable cover 14 is gradually opened. In contrast, when the link lever 23 tilts upward in association with the upward movement of the cutting machine body 10 and the front end portion 23b is displaced in the opposite direction around the center of turn of the movable cover 14, the abutment wall portion 14a is not pressed by the front end portion 23a in the opening direction, and hence the movable cover 14 is closed by its own weight and an urging force in the closing direction.

The electric motor 16 is provided with a handle portion 15 which allows the user to grip on the side portion of the front side thereof in the case of the embodiment, the handle portion 15 is provided in the lateral direction so as to extend leftward and rightward (the direction along the axis of rotation of the rotary blade 12).

As shown in FIG. 5 and FIG. 6, a rear edge portion 13b of the fixed cover 13 on the rear side of the spindle 18 is recessed upward by a dimension L with respect to the front edge portion 13a thereof which corresponds to the end on the opening side and on the front side of the spindle 18. Hereinafter, the rear edge portion 13b of the fixed cover 13, which is recessed upward by the dimension L is also referred to as the relief portion 13b of the fixed cover 13. With the position of the relief portion 13b on the rear side, the range of height of the rotary blade 12, which is disposed from the rear side (the cutting depth), is increased.

With the configuration in which the cutting depth on the rear side of the spindle 18 (the center of rotation of the rotary blade 12) is increased in this manner, downward movement to the lowermost position is achieved without interference with the positioning fence 32 being relatively high from the table 20, whereby the cutting operation of the cut material W1 by a large cutting depth is achieved by placing the cut material W1 so as to lean obliquely against the positioning surface 32a of the positioning fence 32 as shown in the drawing, or by placing the cut material W2 upright along the positioning surface 32a.

Also, with the arrangement of the relief portion 13b on the fixed cover 13, even when the cutting machine body 10 is moved upward to fully close the movable cover 14, part of the peripheral edge (cutting edge) of the rotary blade 12 is covered neither with the fixed cover 13 nor the movable cover 14 at the relief portion 13b. In this configuration, part of the cutting edge of the rotary blade 12 which is covered neither with the fixed cover 13 nor the movable cover 14 is adapted to be covered by an auxiliary cover 80.

Figure 7:
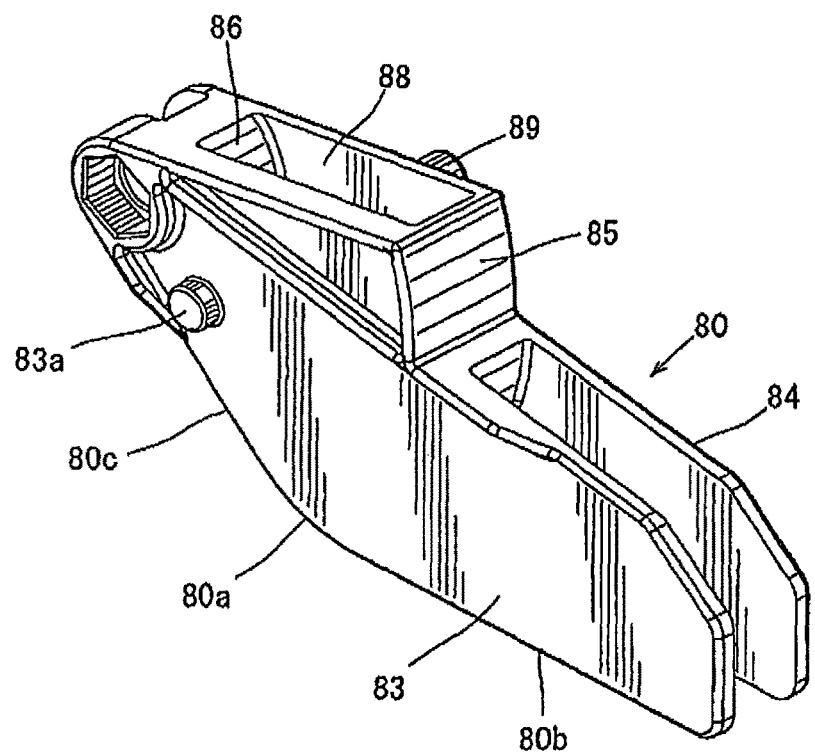
FIG. 7 is a perspective view of the auxiliary cover as a single unit.
Figure 8:
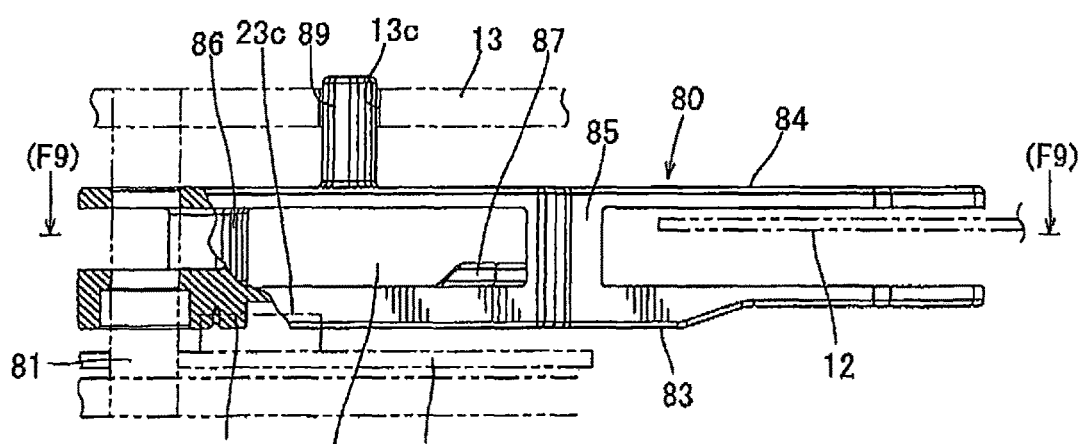
FIG. 8 is a plan view of the auxiliary cover as a single unit.
Figure 9:
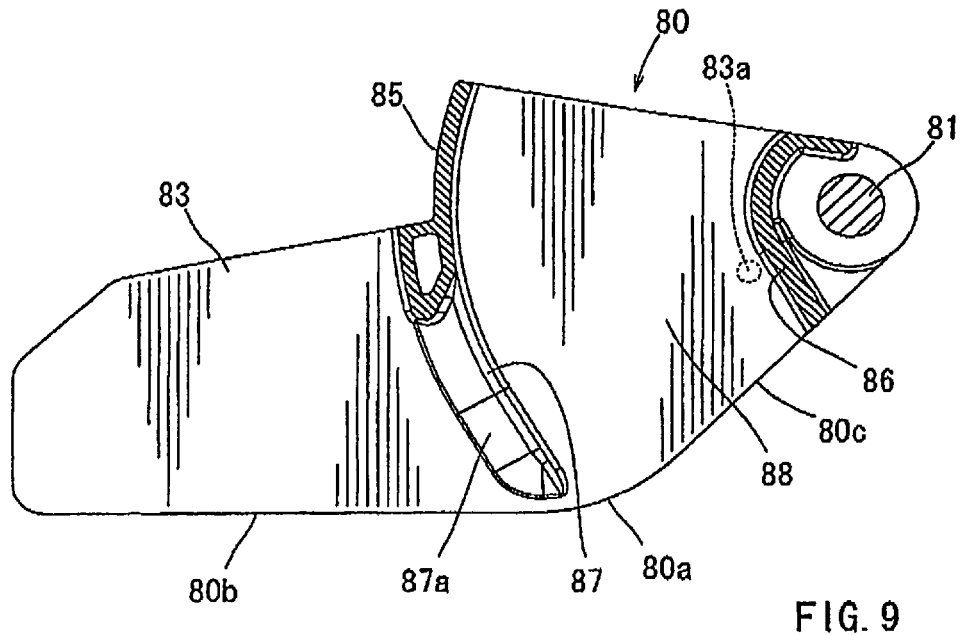
FIG. 9 is a vertical cross-sectional view of the auxiliary cover taken along the line (F9)-(F9) in FIG. 8.

As shown in FIG. 5, the auxiliary cover 80 is supported inside the fixed cover 13. The auxiliary cover 80 is supported by the fixed cover 13 in a state of being capable of tilting in the vertical direction via a shaft 81. The auxiliary cover 80 is urged in the direction to rotate downward (closing side, clockwise in FIG. 5) by a torsion spring 82 interposed between the auxiliary cover 80 and the fixed cover 113. FIG. 7 to FIG. 9 illustrate the auxiliary cover 80 as a single unit.

The auxiliary cover 80 includes a pair of left and right shielding edges 83 and 84. Both the shielding edges 83 and 84 are coupled to each other in parallel by partitioning walls 85 and 86 at two points, that is, at a midpoint and a point near the rear end portion in terms of the longitudinal direction thereof. As shown in FIG. 9, on the inner surface of the left shielding edge 83 (when viewed from the user) is provided with a guiding wall portion 87 so as to extend from an approximate midpoint of the partitioning wall 85. A dust colleting channel 88 is defined by the front and rear partitioning walls 85 and 86 and the guiding wall portion 87. The upper portion of the dust colleting channel 88 is directed toward a dust collecting port 19 at the time of cutting operation carried out by the downward movement of the cutting machine body 10 as shown in FIG. 5. In this manner, the auxiliary cover 80 has a function for guiding (correcting) chips generated by the cutting operation toward the dust collecting port 19. The guiding wall portion 87, defined continuously from the partitioning wall 85, is formed into a shape extending into an angular shape in cross section, and a inclined surface 87a on the front side thereof (the left inclined surface in FIG. 9) is formed in a more gradual angle in comparison with the inclined surface on the rear side. With this gradually inclined surface 87a, the chips blown upward from the cutting portion are collected more smoothly and reliably into the dust colleting channel 88. The dust colleting channel 88 formed between both the partitioning walls 85 and 86 is curved obliquely rearward and upward, and the dust collecting port 19 is arranged to extend therefrom. In this configuration as well, the efficiency of dust collection is improved.

The front portion of the auxiliary cover 80 with respect to the partitioning wall 85 on the distal end side of the tilting movement includes both the shielding edges 83 and 84 protruding forward in parallel to each other in a bifurcated shape. As shown in FIG. 8, the cutting edge of the rotary blade 12 can enter between both the shielding edges 83 and 84 formed into the bifurcated shape to achieve the shielding thereof.

The shielding edge 84 (which is the right side when viewed from the user) is provided with a restraining shaft 89 on the outer surface thereof so as to project sideward. The restraining shaft 89 is inserted into an arc-shaped restraining groove 13c formed on the rear side of the fixed cover 13 (the right side portion when viewed from the user) so as to be displaceable with respect to each other as shown in FIG. 6. The auxiliary cover 80 is adapted to be able to turn in the vertical direction within a range in which the restraining shaft 89 is displaceable in the restraining groove 13c, whereby the uppermost position (opened position) and the lowermost position (closed position) of the auxiliary cover 80 are restrained. As shown in FIG. 7, the outside surface of the shielding edge 83 on the left side is provided with an engaging projection 83a. Correspondingly, the link lever 23 is provided with a restraining projection 23c on the side portion thereof so as to protrude sideward as shown in FIG. 1 to FIG. 4. In a state in which the cutting machine body 10 is located at the uppermost position as a waiting position as shown in FIG. 1, the auxiliary cover 80 is held at a closed position at the lowermost side by the urging force of the spring. In this state, the restraining projection 23c of the link lever 23 is located above the engaging projection 83a. Therefore, turn of the auxiliary cover 80 in the opening direction is restrained, so that the auxiliary cover 80 is reliably held at the closing position.

Figure 2:
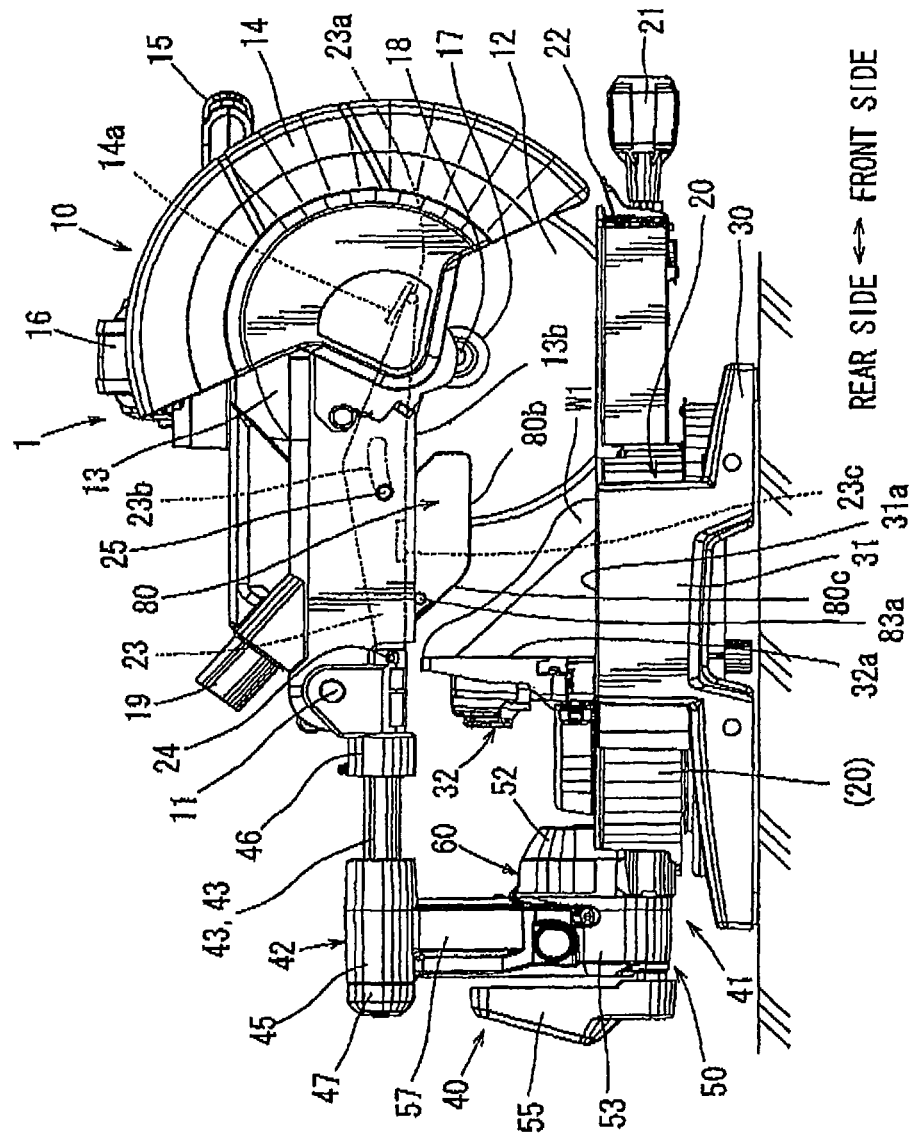
FIG. 2 is a general side view of a table cutting machine according to the embodiment.
Figure 3:
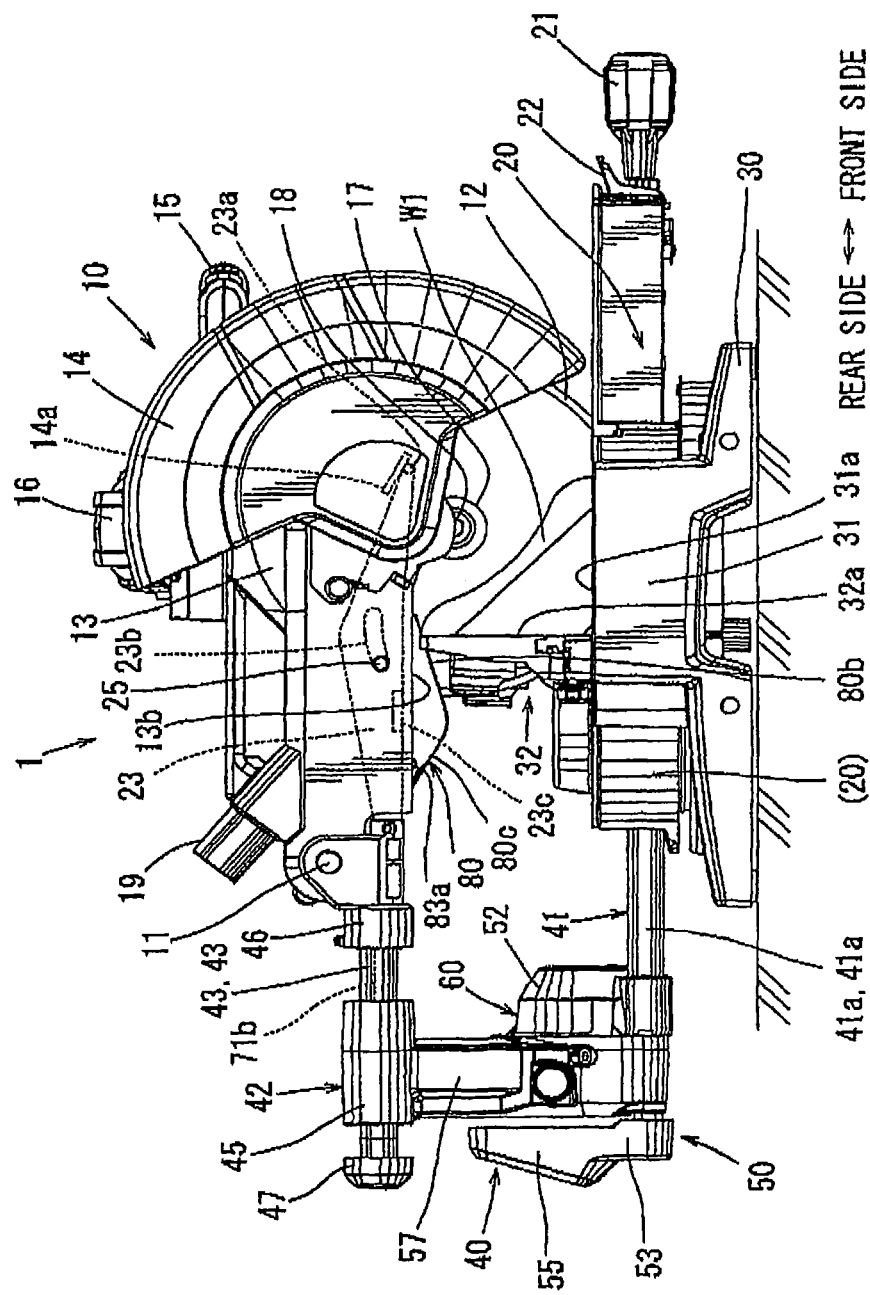
FIG. 3 is a general side view of the table cutting machine according to the embodiment.
Figure 4:
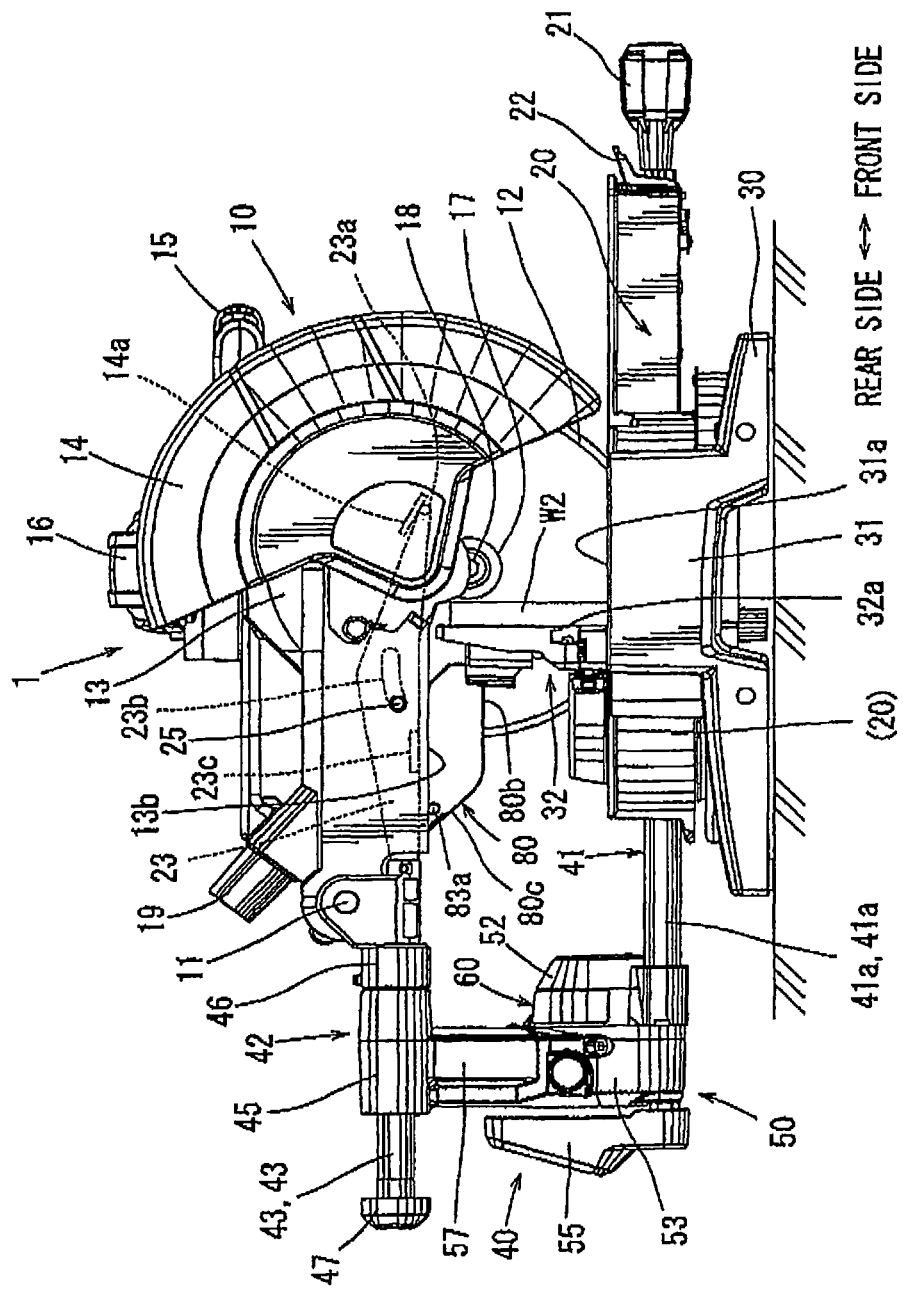
FIG. 4 is a general side, view of the table cutting machine according to the embodiment.

Further, as shown in FIG. 2 to FIG. 4, when the cutting machine body 10 is moved downward, the link lever 23 tilts downward accordingly. Therefore, the restraining projection 23c is retracted from above the engaging projection 83a toward the front, whereby the auxiliary cover 80 is brought into a state of being capable of turning upward toward the opened position. However, as described later, the auxiliary cover 80 is held at the closed position by the torsion spring 82 unless the auxiliary cover 80 interferes with the cutting material W or positioning fence 32 during the cutting operation. As shown in FIG. 3, when the cutting machine body 10 is slid rearward by the upper and lower sliding mechanisms 41 and 42 in the two levels and, in the course of the sliding movement, the lower end portion of the auxiliary cover 80 interferes with the upper portion of the cutting material W or the positioning fence 23, and the cutting machine body 10 is continuously slid rearward in this interfered state, whereby the auxiliary cover 80 is opened upward against the torsion spring 82. In other words, as illustrated by FIGS. 1-4, the engaging projection 83a, which is a part of the auxiliary cover 80, is configured to contact the restraining projection 23c of the link lever 23 so as to be prevented from opening when the cutting machine body 10 is at an upper waiting position (FIG. 1), and the engaging projection 83a can be moved such that the engaging projection 83a does not contact the restraining projection 23c (i.e., removably contact) when the cutting machine body 10 is moved downward (FIGS. 2-4).

The lower end portion of the auxiliary cover 80 is formed into an angular shape protruded downward as shown in the drawing. A top 80a of the lower end portion is arranged near the end portion of the guiding wall portion 87. Hereinafter, the front side of the auxiliary cover 80 with respect to the top 80a (the left side in FIG. 9) is referred to as a front lower end 80b, and the rear side thereof with respect to the top 80a (the right side in FIG. 9) is referred to as a rear lower end 80c. Both the lower ends 80b and 80c each are formed into a flat shape, and extend to each other to the top 80a at an obtuse angle. The top 80a, the front and rear lower ends 80b and 80c are constituted in the same manner for both the left and right shielding edges 83 and 84.

When the cutting machine body 10 is positioned at the uppermost position as shown in FIG. 1, the auxiliary cover 80 is in a state of being locked at the closed position. In this state, the lowermost position (closed position) of the auxiliary cover 80 is further adequately set by the position of the restraining groove 23b or the like so that the rear lower end 80c of the auxiliary cover 80 extends substantially in parallel (horizontal) with respect to the upper surface of the table 20. On the other hand, at this time, the front lower end 80b of the auxiliary cover 80 enters inside the movable cover 14 and is positioned at the end portion of the movable cover 14. Accordingly, the entire circumference of the rotary blade 12 is substantially completely covered with the fixed cover 13, the movable cover 14 and the auxiliary cover 80 without exposing the rotary blade 12 to the outside.

In the state in which the auxiliary cover 80 is positioned at the closed position described above, the front lower end 80b is positioned substantially in parallel to the rear edge portion 13b of the fixed cover 13. The closed position of the auxiliary cover 80 is restrained by the abutment of restraining shaft 89 with the lower end portion of the restraining groove 13c as shown in FIG. 6.

As shown in FIG. 2 and FIG. 6, the auxiliary cover 80 is not opened by the downward movement of the cutting machine body 10, and is maintained at the closed position over the entire range of the vertical movement thereof. Therefore, even when the cutting machine body 10 is located at the lowermost position and hence the movable cover 14 is completely opened as shown in FIG. 2, it is held at the closed position by the torsion spring 82. However, in this state, the restraining projection 23c of the link lever 23 is retracted from above the engaging projection 83a and the locked state is released, whereby the auxiliary cover 80 is in a state of being capable of turning toward the opened position (upward).

As shown in FIG. 2 and FIG. 6, when the cutting machine body 10 is moved downward substantially to the lowermost position in a state of being slid to the frontmost side (the near side of the user) by the upper and lower sliding mechanisms 41 and 42 and then the cutting machine body 10 is slid rearward by the operation of the upper and lower sliding mechanism 41 and 42, the rotary blade 12 cuts into the cut material W2 to achieve the cutting operation thereof.

When the cutting machine body 10 is slid rearward and hence the cutting operation proceeds, the rear lower end 80c of the auxiliary cover 80 interferes with the cut material W2 or the upper portion of the positioning fence 32, and the cutting machine body 10 is slid further rearward in this state, so that the auxiliary cover 80 is pressed upward and opened. In this manner, the front lower end 80b is oriented horizontally when the auxiliary cover 80 is at the closed position, and hence the rear lower end 80c is positioned in an inclined state in which the rear side is higher and serves as a guiding inclined surface, thereby opening smoothly in association with the rearward sliding movement of the cutting machine body 10.

In the intermediate stopper mechanism 70, in a state in which the switch lever portion 71c is switched to the intermediate locked position, the rearward sliding distance of the cutting machine body 10 is restrained to the midpoint. A state in which the rearward sliding distance of the cutting machine body 10 is restrained to the midpoint of the entire sliding distance (via the upper and lower sliding mechanisms 41 and 42) by the intermediate stopper mechanism 70 is shown in FIG. 3. As shown in the drawing, the stopper shaft portion 71b of the intermediate stopper mechanism 70 abuts against the center rib 45b and the retracting distance of the cutting machine body 10 is restrained to the midpoint, so that the cut material W2 (placed so as to lean obliquely between the positioning fence 32 and the table 20) is completely cut off by the rotary blade 12, and interference of the protruded portion 13d of the fixed cover 13 with respect to the cut material W2 is avoided in advance, whereby damage of the cutting material W is avoided in advance. In the state of being restrained to the midpoint, the top 80a of the auxiliary cover 80 passes from the front side to the rear side with respect to the positioning fence 32, and the front lower end 80b thereof is restrained to a state of moving halfway on the upper end of the positioning fence 32. Accordingly, the intermediate stopper mechanism 70 is settled in a state in which the front lower end 80b of the auxiliary cover 80 is moving halfway on the upper end portion of the positioning fence 32, where the entire auxiliary cover 80 functions for avoiding the rearward movement of the positioning fence 32. In this manner, with the arrangement of the intermediate stopper mechanism 70, since the entire auxiliary cover 80 is prevented from moving to the rear side of the positioning fence 32, the auxiliary cover 80 is abutted against the back surface of the fence 32 in the stage of returning the cutting machine body 10 to the front side and, consequently, the forward sliding operation of the cutting machine body 10 is avoided from being hindered in advance.

Further, in a state in which the switch lever 71c of the intermediate stopper mechanism 70 is switched to the unlocked position in advance, the cutting machine body 10 is allowed to be slid to the rearmost position in the entire sliding range by the upper and lower sliding mechanisms 41 and 42 as shown in FIG. 4. In this case, for example, by placing the cut material W2 (of a flat board shape) upright along the positioning plane 32a of the positioning fence 32 with the widthwise direction thereof oriented in the vertical direction as shown in the drawing, which is different from the case of the cut material W1, the cutting operation is achieved in a state of being fixed with a significant height. When the cutting machine body 10 is slid to the rearmost position in the entire sliding range, the rotary blade 12 is passed completely through the lower end of the positioning surface 32a, so that the rotary blade 12 can completely cut off the lower end portion of the cut material W2, whereby the cutting operation thereof is reliably achieved. In this regards, when the rearward sliding distance of the cutting machine body 10 is retrained to a midpoint thereof by the intermediate stopper mechanism 70 as shown in FIG. 3, even when the rotary blade 12 does not pass completely on the side of the lower portion of the positioning surface 32a, it is not a cause for concern because in this situation the cutting operation is for cutting material W1 in the state of being placed obliquely (so as to lean against the upper surface of the table and the positioning fence 32).

The rearmost position of the entire sliding range is set so as to prevent the height of the protruded portion 13d of the fixed cover 13 from interfering with the high cut material. W2 or the positioning fence 32 even when the intermediate stopper mechanism 70 is released to the unlocked side and the cutting machine body 10 is able to slide to the rearmost position of the entire sliding range.

When the intermediate stopper mechanism 70 is switched to the unlocked side, and the cutting machine body 10 is able to slide to the rearmost position of the entire sliding range, the entire auxiliary cover 80 is moved to the rear side of the fence 32 as shown in FIG. 4. Consequently, the front lower end 80b moves apart from the upper end portion of the positioning fence 32 to the rear, and the auxiliary cover 80 is returned to the closed position by the urging force of the torsion spring 82. In this case, interference of the auxiliary cover 80 with respect to the positioning fence 32 may be avoided by moving the cutting machine body 10 upward first and then sliding the same toward the front.

Although it is not shown in the drawing, by additionally providing the auxiliary cover 80 with a guiding surface which is inclined in the direction to cause the auxiliary cover 80 to turn toward the opened position when interfered with the upper portion of the positioning fence 32 at the time of the forward sliding movement of the cutting machine body 10, the cutting machine body 10 is allowed to be returned to the front side in the state of being positioned at the lowermost position while avoiding obstruction of the auxiliary cover 80 with respect to the back surface of the positioning fence 32.

The detailed configuration of the auxiliary cover 80 will be summarized here.

(Arrangement of Auxiliary Cover 80)

(1) The auxiliary cover 80 moves integrally with the cutting machine body 10 from in front of the positioning fence 32 (the position shown in FIG. 2) to a position where it is entirely passed therethrough to the rear (the position shown in FIG. 4) over the entire sliding range of the cutting machine body 10.

(2) With the configuration of the intermediate stopper mechanism 70, the rearmost position of the auxiliary cover 80 does not pass completely through the positioning fence 32 but the front lower end 80b thereof is restrained to a position halfway on the upper end portion of the positioning fence 32 (the position shown in FIG. 3).

(3) In the state in which the front lower end 80b of the auxiliary cover 80 is approximately halfway on the upper end portion of the positioning fence 32, the front lower end 80b is inclined in the direction in which the front side is higher as shown in FIG. 3. Consequently, when the cutting machine body 10 is returned to the front side from this state, the auxiliary cover 80 is turned to the opened side (upper side) against the torsion spring 82, so that the forward sliding movement of the cutting machine body 10 is smoothly achieved.

(4) The rear lower end 80c of the auxiliary cover 80 functions as the guiding surface against the positioning fence 32 when retracting the cutting machine body 10 as described above.

(5) The auxiliary cover 80 is supported inside the fixed cover 13. Therefore, the auxiliary cover 80 is stored inside the fixed cover 13 when being turned to the upper opened position. Accordingly, interference of the auxiliary cover 80 with the cutting material W or the positioning fence 32 is avoided during the oblique cutting operation carried out with the cutting machine body 10 inclined leftward or rightward.

(6) When the auxiliary cover 80 is in the closed position, the front lower end 80b is positioned substantially horizontally, and is protruded to the substantially same level as, or to a lower level than, the front edge portion 13a of the fixed cover 13. Accordingly, the auxiliary cover 80 is provided with a higher dust collecting function.

Further, turning the end of the auxiliary cover 80 toward the opened position allows for a position entirely set or stored inside the fixed cover 13. Therefore, the auxiliary cover 80 is able to turn until the top 80a thereof is displaced upwardly of the rear edge portion 13b of the fixed cover 13. Accordingly, the auxiliary cover 80 is prevented from hindering the sliding operation of the cutting machine body 10. Also, the cutting depth increasing function of the rear edge portion 13b, which is recessed upward by the dimension L with respect to the front edge portion 13a, reliably functions.

(Shape of Auxiliary Cover 80)

(7) The lower portion of the auxiliary cover 80 is formed into an angular shape protruding downward. The front lower end 80b and the rear lower end 80c are formed on the front side and the rear side of the top 80a, respectively, and each function as guiding surface against the positioning fence 32 or the cutting material W when sliding the cutting machine body 10 as described above.

(8) The width of the auxiliary cover 80 is set to a width smaller than that of the movable cover 14. Therefore, when the cutting machine body 10 is positioned at the uppermost position, the movable cover 14 is fully closed and the auxiliary cover 80 is positioned in the closed position as shown in FIG. 1, the front lower end 80b of the auxiliary cover 80 enters inside the movable cover 14.

In this manner, since the width of the auxiliary cover 80 is set to the width smaller than that of the movable cover 14, at the time of the oblique cutting operation carried out by inclining the cutting machine body 10 leftward or rightward as described above, interference of the auxiliary cover 80 with the cutting material W or the positioning fence 32 is avoided, and hence the oblique cutting operation can be achieved at a sufficiently large angle.

(9) The lateral distance between the rotary blade 12 and the left shielding edge 83 of the auxiliary cover 80 is larger than the distance between the rotary blade 12 and the right shielding edge 84 of the auxiliary cover 80. Thus, when rotary blade 12 is removed, the left shielding edge 83 does not interfere with rotary blade 12.

(10) As shown in FIG. 2, in the course of sliding the cutting machine body 10 rearward in a state of being positioned at the lowermost position, there is no fixed portion of the cutting machine body 10 that protrudes downwardly of the front lower end portion Ha of the fixed cover 13 (at a position on the rear side of the auxiliary cover 80). Accordingly, a larger cutting depth is reliably achieved in the area on the rear side of the center of rotation of the rotary blade 12 (the mounting flange 17) than in the front area.

(Operation of Auxiliary Cover 80)

(11) In a state of placing the cutting machine body 10 at the uppermost position, the auxiliary cover 80 is locked to the closed position. In this example, the restraining projection 23c is provided on the link lever 23 for opening and closing the movable cover 14 and the engaging projection 83a is provided on the auxiliary cover 80, so that the upward (in the opening direction) turn of the auxiliary cover 80 is restrained and hence the auxiliary cover 80 is locked at the closed position by positioning the engaging projection 83a downwardly of the restraining projection 23c.

Since the auxiliary cover 80 is locked to the closed position at the uppermost position of the cutting machine body 10, the accidental opening operation of the auxiliary cover 80 is reliably prevented.

(12) The auxiliary cover 80 is supported with respect to the fixed cover 13 via the shaft 81 so as to be capable of turning in the vertical direction. The auxiliary cover 80 is opened by being turned upward, and is closed by being turned downward. The auxiliary cover 80 is supported by the shaft 81 at the rear end portion thereof so as to be capable of turning. The movable cover 14, may be configured to support the same so as to be capable of turning in the vertical direction about the front end portion. The auxiliary cover is not limited to the configuration to turn in the vertical direction, and an auxiliary cover which moves between the closed position and the opened position by moving in parallel in the vertical direction is also applicable.

(13) The auxiliary cover 80 is urged by the torsion spring 82 toward the closed position. (downward). By employing the torsion spring as the urging means, a compact configuration is achieved by using the shaft 81. An extension spring, a compression spring, or a damper may be used instead of the torsion spring 82 to urge the auxiliary cover 80 to the closed position.

(14) As exemplified above, in addition to the configuration in which the restraining groove 13c is provided on the fixed cover 13, and the restraining shaft 89 is provided on the auxiliary cover 80, so that the opened position of the auxiliary cover 80 is restrained by the abutment of the restraining shaft 89 against the upper end of the restraining groove 13c and the closed position of the auxiliary cover 80 is restrained by the abutment of the restraining shaft 89 against the lower end of the restraining groove 13c, a configuration in which stopper projections for restraining the opened position and for restraining the closed position respectively are provided on the fixed cover 13, so that the opened position and the closed position of the auxiliary cover are restrained, is also applicable.

(Dust Collection Function of Auxiliary Cover)

(15) The exemplified auxiliary cover 80 includes the dust colleting channel 88. The dust colleting channel 88 is positioned between the portion where the chips are generated (mainly the rear side of the rotary blade 12) and the dust collecting port 19, so that the generated chips are guided to the dust collecting port 19 further reliably and collected efficiently.

(16) The dust colleting channel 88 is formed between the partitioning walls 85 and 86. The front partitioning wall 85 may be adapted to function as a wall portion for preventing the generated chips interacting along the direction of rotation of the rotary blade 12.

(17) The guiding wall portion 87 having the gentle inclined surface 87a on the front side, is continuously provided on the lower side of the front partitioning wall 85. The chips generated at the cutting position are smoothly guided into the dust colleting channel 88 with the inclined surface 87a on the front side of the guiding wall portion 87.

(18) As shown in FIG. 5, the dust collecting port 19 is arranged to extend from the dust colleting channel 88 that is curved obliquely and upward on the rear side. Accordingly, the dust collecting efficiency may further be enhanced.

According to the table cutting machine 1 in the embodiment configured as described above, when the cut machine body 10 is moved upward to the waiting position, the entire circumference of the cutting edge of the rotary blade 12 is covered by the fixed cover 13, the movable cover 14 and the auxiliary cover 80.

The auxiliary cover 80 is provided with the engaging projection 83a, and correspondingly, the link lever 23 is provided with the restraining projection 23c. In the state in which the cutting machine body 10 is positioned at the waiting position, the restraining projection 23c protrudes to a position above the engaging projection 83a, so that the upward displacement thereof is restrained and, consequently, the auxiliary cover 80 is restrained from turning in the opening direction (upward). Accordingly, the accidental opening operation of the auxiliary cover 80 is prevented. In this arrangement, in the state in which the cutting machine body 10 is positioned at the waiting position, and the table cutting machine 1 is not in use, the cutting edge of the rotary blade 12 is reliably covered over the entire circumference thereof.

Furthermore, since the auxiliary cover 80 has a function to position the dust colleting channel 88 between the cutting portion and the dust collecting port 19 and guide the chips generated at the cutting portion, the efficiency of dust collection is enhanced.

The auxiliary cover 80 is supported by the fixed cover 13 via the shaft 81 so as to be capable of turning in the vertical direction, and includes the front lower end 80b inclined from the top 80a downward toward the front and the rear lower end 80c inclined downward toward the rear on the lower portion thereof. When the cutting machine body 10 slides rearward, the rear lower end 80c functions as a guiding surface by being in sliding contact with the upper portion of the positioning fence 32, so that the auxiliary cover 80 is retracted upward and the auxiliary cover 80 thus does not hinder the sliding movement of the cutting machine body 10. Further, when the cutting machine body 10 slides forward, the front lower end 80b functions as a sliding surface by being in sliding contact with the upper portion of the positioning fence 32, so that the auxiliary cover 80 is retracted upward and the auxiliary cover 80 does not hinder the sliding movement of the cutting machine body 10. In this manner, the exemplified auxiliary cover 80 is devised so as not to hinder the sliding operation of the cutting machine body 10.

The exemplified table cutting machine 1 is provided with the intermediate stopper mechanism 70 for restraining the retracting movement at the midpoint of the entire sliding distance for the fore-and-aft sliding movement of the cutting machine body 10. According to the intermediate stopper mechanism 70, a state in which the cutting machine body 10 is slidable over the entire fore-and-aft sliding range thereof and an intermediately stopped state in which retracting movement of the cutting machine body 10 is disabled at the midpoint are switched with a simple operation. With the intermediate stopper mechanism 70, as regards the relatively high cutting material W, the retracting operation of the cutting machine body 10 is restrained before the interference of the mounting flange 17 for fixing the rotary blade 12 to the spindle 18. Therefore, the cutting material W is prevented from becoming damaged in advance, and the cutting operation with a large cutting depth is achieved.

The embodiment described thus far may be modified in various manners. For example, although the configuration in which the auxiliary cover 80 is provided in the cutting machine body 10 configured in such a manner that the rear edge portion 13b of the fixed cover 13 is recessed upward by the dimension L from the front lower edge portion 13a to secure a larger cutting depth is exemplified, the auxiliary cover in the present invention may be applied also to the cutting machine body provided with the fixed cover which does not have the relief portion 13b as described above.

In the description above and in the drawings, the auxiliary cover 80 includes engaging projection 83a which is engagable with restraining projection 23c of link lever 23. Those skilled in the art will recognize that various shapes and locations of each projection can change without departing from the scope of the description herein. Such changes can be made while still retaining the functionality of restraining upward movement of the auxiliary cover 80 when in upper waiting position.

Although the configuration in which the auxiliary cover 80 turns about the rear end side thereof is exemplified, the auxiliary cover which is turned in the vertical direction about the front end side thereof.

Although the auxiliary cover 80 which turns in the vertical direction via the shaft 81 is exemplified, the auxiliary cover which moves in parallel in the vertical direction between the closed position and the opened position is also applicable.

Although the configuration in which the stopper body 71 is supported on the side of the tilting bracket 46, which corresponds to the sliding side, and the stopper shaft portion 71b is brought into abutment with the bearing holder 45 side, which corresponds to the sliding movement supporting side is exemplified as the intermediate stopper mechanism, the configuration in which the amount of sliding movement of the cutting machine body 10 is restrained by providing the stopper body on the sliding movement supporting side in contrast and bringing the stopper shaft portion into abutment with the sliding side is also applicable.

The intermediate stopper mechanism may be applied not only to the upper slide mechanism 42, but also to the lower slide mechanism 41, or to the both.

Although the configuration in which the intermediate stopper mechanism 70 is applied to the table cutting machine 1 provided with the upper and lower slide mechanisms 41 and 42 at two levels is exemplified, the intermediate stopper mechanism 70 is also applicable to the table cutting machine having a single level sliding mechanism.

In contrast, the intermediate stopper mechanism 70 may be omitted. One 61 of the angle scales (or 62) may be omitted from the inclined angle display device 60. Although the V-shaped fixing lever 55 is exemplified as the fixing lever for fixing the angle of inclination of the cutting machine body 10, a configuration which employs a single-grip fixing lever or a three-grip type fixing lever, which are generally used, instead is also applicable.

The exemplified auxiliary cover is also applicable to a table cutting machine of a type which does not have the front and rear slide mechanisms 41 and 42 and the lateral tilt supporting mechanism 50, and carries out the cutting operation by moving the cutting machine body simply in the vertical direction.

What is claimed is:
1. A cutting machine comprising:
   a table having an upper surface and configured to support a workpiece on the upper surface;
   a fence disposed on the upper surface of the table and configured to position the workpiece;
   a cutting machine body including a rotary blade, a fixed cover configured to cover a portion of the rotary blade, and a movable cover configured to cover a portion of the rotary blade that is not covered by the fixed cover, wherein the movable cover is movable between a closed position for covering the portion of the rotary blade and an open position for uncovering the portion of the rotary blade;
   a support device configured to support the cutting machine main body such that (i) the cutting machine main body is vertically movable between an upper end position and a lower end position and (ii) the cutting machine main body is slidably movable within a slidable range from a first end to a second end in a sliding direction substantially parallel to the upper surface of the table; and
   an intermediate stopper device having a stopper end portion configured to selectively engage a portion of the support device in order to prevent a sliding movement of the cutting machine main body from an intermediate position within the slidable range toward the first end of the slidable range while at the same time permitting the sliding movement of the cutting machine main body from the intermediate position within the slidable range toward the second end of the slidable range,
   wherein the movable cover comprises a first cover for covering a portion of the rotary blade closer to the support device; and
   wherein the first cover is configured such that:
   when the cutting machine main body is at the lower end position and at least between the intermediate position and the first end of the slidable range in the sliding direction, the first cover takes a position where the first cover has moved from the closed position toward the open position through contact with the workpiece or the fence.

2. The cutting machine according to claim 1, wherein:
the support device comprises a support arm and a slide bar slidable relative to the support arm;
the cutting machine main body is vertically movably connected to the slide bar via a bracket; and
the intermediate stopper device is disposed at one of the support arm and the bracket.

3. The cutting machine according to claim 2, wherein:
the intermediate stopper device comprises a stopper member mounted to one of the support arm and the bracket so as to be movable relative thereto between a restraining position and a non-restraining position;
when the stopper member is positioned at the restraining position, the stopper member prevents the cutting machine main body from moving from the intermediate position toward a second end of the slidable range opposite to the first end through abutment to the other of the support arm and the bracket; and
when the stopper member is positioned at the non-restraining position, the stopper member allows the cutting machine main body to move from the intermediate position toward the second end of the slidable range.

4. The cutting machine according to claim 3, wherein:
the stopper member is pivotable about an axis between the restraining position and the non-restraining position.

5. The cutting machine according to claim 4, wherein:
the stopper member comprises an end portion; and
when the stopper member is positioned at the restraining position, the end portion is situated between the support arm and the bracket to be opposed to the other of the support arm and the bracket in the sliding direction.

6. The cutting machine according to claim 5, wherein:
the support arm supports the slide bar via a holder;
the slide bar extends through the holder in the sliding direction; and
the end portion of the stopper member is opposed to the holder or the bracket in the sliding direction.

7. The cutting machine main according to claim 5, wherein:
when the stopper member is positioned at the restraining position, the stopper member extends substantially parallel to the slide bar.

8. The cutting machine according to claim 1, wherein:
the first cover is normally held at the closed position by a spring; and
the first cover moves toward the open position against a force of the spring through abutment to the workpiece or the fence.

9. The cutting machine according to claim 8, wherein:
the first cover is pivotally supported by the fixed cover via a support shaft.

10. The cutting machine according to claim 9, wherein:
the first cover includes a pair of shielding portions configured to define a dust collection channel therebetween.

11. The cutting machine according to claim 1, wherein:
the movable cover further comprises a second cover for covering a portion of the rotary blade farther from the support device; and
the second cover is configured to open and close in response to the vertical movement of the cutting machine main body.

12. A cutting machine comprising:
a table having an upper surface and configured to support a workpiece on the upper surface;
a cutting machine body including a rotary blade;
a support device configured to support the cutting machine main body such that (i) the cutting machine main body is vertically movable between an upper end position and a lower end position and (ii) the cutting machine main body is slidably movable within a slidable range in a sliding direction substantially parallel to the upper surface of the table; and
an intermediate stopper device having a stopper end portion configured to selectively engage a portion of the support device in order to operate in a prevention mode and a release mode, wherein
the prevention mode prevents a sliding movement of the cutting machine main body from a position between a first end of the slidable range and an intermediate position within the slidable range toward a second end of the slidable range opposite to the first end beyond the intermediate position while at the same time permitting the sliding movement of the cutting machine main body from the position between the first end of the slidable range and the intermediate position within the slidable range toward the first end of the slidable range, and
the release mode permits the sliding movement of the cutting machine main body through the slidable range.

13. The cutting machine according to claim 12, wherein:
the support device comprises a support arm and a slide bar slidable relative to the support arm;
the cutting machine main body is vertically movably connected to the slide bar via a bracket; and
the intermediate stopper device is disposed at one of the support arm and the bracket.

14. The cutting machine according to claim 13, wherein:
the intermediate stopper device comprises a stopper member mounted to one of the support arm and the bracket so as to be movable relative thereto between a restraining position and a non-restraining position;
when the stopper member is positioned at the restraining position, the stopper member prevents the cutting machine main body from moving from the intermediate position toward a second end of the slidable range opposite to the first end through abutment to the other of the support arm and the bracket; and
when the stopper member is positioned at the non-restraining position, the stopper member allows the cutting machine main body to move from the intermediate position toward the second end of the slidable range.

15. The cutting machine according to claim 14, wherein:
the stopper member is pivotable about an axis between the restraining position and the non-restraining position.

16. The cutting machine according to claim 15, wherein:
the stopper member comprises an end portion; and
when the stopper member is positioned at the restraining position, the end portion is situated between the support arm and the bracket to be opposed to the other of the support arm and the bracket in the sliding direction.

17. The cutting machine according to claim 16, wherein:
the support arm supports the slide bar via a holder;
the slide bar extends through the holder in the sliding direction; and
the end portion of the stopper member is opposed to the holder or the bracket in the sliding direction.

18. The cutting machine main according to claim 16, wherein:
when the stopper member is positioned at the restraining position, the stopper member extends substantially parallel to the slide bar.

19. A cutting machine comprising:
a table having an upper surface and configured to support a workpiece on the upper surface;
a fence disposed on the upper surface of the table and configured to position the workpiece;
a cutting machine body including a rotary blade, a fixed cover configured to cover a portion of the rotary blade, and a movable cover and an auxiliary cover each configured to cover a portion of the rotary blade that is not covered by the fixed cover,
wherein each of the movable cover and the auxiliary cover is movable between a closed position for covering the portion of the rotary blade and an open position for uncovering the portion of the rotary blade;
a support device configured to support the cutting machine main body such that (i) the cutting machine main body is vertically movable between an upper end position and a lower end position and (ii) the cutting machine main body is slidably movable within a slidable range in a sliding direction substantially parallel to the upper surface of the table,
wherein the support device comprises:
  a support arm laterally tiltably connected to the table;
  a holder disposed at an upper portion of the support arm;
  a pair of parallel slide bars slidably supported by the holder and extending through the holder; and
  a bracket fixedly connecting end portions of the pair of slide bars to each other and vertically tiltably supporting the cutting machine main body; and
an intermediate stopper device configured to prevent and permit a sliding movement of the cutting machine main body from an intermediate position within the slidable range toward a first end of the slidable range,
wherein the intermediate stopper device includes a stopper member pivotable relative to one of the holder and the bracket between a restraining position and a non-restraining position about an axis;
wherein the stopper member includes an end portion configured to selectively engage a portion of the support device;
wherein when the stopper member is positioned at the restraining position, the end portion is situated between the holder and the bracket to be opposed to the other of the holder and the bracket in the sliding direction, so that the end portion of the stopper member contacts the other of the holder and the bracket in the sliding direction when the cutting machine main body reaches the intermediate position as a result of the movement from a position between a second end opposite to the first end of the slidable range and the intermediate position toward the first end in a cutting direction;
wherein the movable cover is configured to open and close in response to the vertical movement of the cutting machine main body;
wherein the auxiliary cover is normally held in the closed position by a spring; and
wherein the auxiliary cover is configured such that:
when the cutting machine main body is at the lower end position and at least between the intermediate position and the first end of the slidable range in the sliding direction, the auxiliary cover takes a position where the auxiliary cover has moved upward from the closed position toward the open position against a force of the spring through contact with the workpiece or the fence.

* * * * *